United States Patent
Saunders

(10) Patent No.: US 11,079,126 B2
(45) Date of Patent: Aug. 3, 2021

(54) CLIMATE SMART FAN VENTILATION

(71) Applicant: Ventamatic, Ltd., Mineral Wells, TX (US)

(72) Inventor: John Stephen Saunders, Coppell, TX (US)

(73) Assignee: Ventamatic, Ltd., Mineral Wells, TX (US)

( * ) Notice: Subject to any disclaimer, the term of this patent is extended or adjusted under 35 U.S.C. 154(b) by 721 days.

(21) Appl. No.: 14/426,733

(22) PCT Filed: Sep. 10, 2013

(86) PCT No.: PCT/US2013/058978
§ 371 (c)(1),
(2) Date: Mar. 7, 2015

(87) PCT Pub. No.: WO2014/043099
PCT Pub. Date: Mar. 20, 2014

(65) Prior Publication Data
US 2015/0285524 A1    Oct. 8, 2015

Related U.S. Application Data

(60) Provisional application No. 61/791,051, filed on Mar. 15, 2013, provisional application No. 61/718,178, (Continued)

(51) Int. Cl.
*F24F 7/06* (2006.01)
*F24F 11/30* (2018.01)
(Continued)

(52) U.S. Cl.
CPC .............. *F24F 7/065* (2013.01); *F24F 11/30* (2018.01); *F24F 11/77* (2018.01);
(Continued)

(58) Field of Classification Search
CPC ....... F24F 7/065; F24F 11/001; F24F 11/0079
(Continued)

(56) References Cited

U.S. PATENT DOCUMENTS 4,058,253 A * 11/1977 Munk .................. F24F 7/06
165/212
4,116,213 A * 9/1978 Kamezaki ............ F25D 17/047
137/360

(Continued)

FOREIGN PATENT DOCUMENTS

DE    102010055065 A1    6/2012
FR         2249291 A1    5/1975

(Continued)

OTHER PUBLICATIONS

Supplementary European Search Report, Application No. EP 13837106 (dated May 31, 2016).

(Continued)

*Primary Examiner* — Steven B McAllister
*Assistant Examiner* — Allen R Schult
(74) *Attorney, Agent, or Firm* — Whitaker Chalk Swindle & Schwartz PLLC; Charles Davis Gunter, Jr.

(57) ABSTRACT

A supply ventilation system controller for locating at an interior of a building. The controller comprises circuitry for receiving a signal representative of exterior air temperature and circuitry for receiving a signal representative of exterior relative humidity. The controller also comprises circuitry for establishing at least a first range of acceptable temperature and circuitry for establishing at least a first range of acceptable relative humidity. The circuitry for providing an enable/disable signal to a fan is responsive to at least one of: (i) the signal representative of exterior air temperature indicating satisfaction of the first range of acceptable temperature; or (ii) the signal representative of exterior relative humidity (Continued)

indicating satisfaction of the first range of acceptable relative humidity.

23 Claims, 16 Drawing Sheets

Related U.S. Application Data filed on Oct. 24, 2012, provisional application No. 61/699,696, filed on Sep. 11, 2012.

(51) Int. Cl.
| | | |
|---|---|---|
| *F24F 11/77* | (2018.01) | |
| *F24F 110/12* | (2018.01) | |
| *F24F 110/00* | (2018.01) | |
| *F24F 110/22* | (2018.01) | |
| *F24F 120/20* | (2018.01) | |

(52) U.S. Cl.
CPC ....... *F24F 2110/00* (2018.01); *F24F 2110/12* (2018.01); *F24F 2110/22* (2018.01); *F24F 2120/20* (2018.01); *Y02B 30/70* (2013.01)

(58) Field of Classification Search
USPC .......................................................... 454/239
See application file for complete search history.

(56) References Cited

U.S. PATENT DOCUMENTS

| | | | | | |
|---|---|---|---|---|---|
| 4,210,278 | A | * | 7/1980 | Obler | F24F 11/08 165/229 |
| 5,031,515 | A | * | 7/1991 | Niemela | F24F 7/08 454/236 |
| 5,881,951 | A | * | 3/1999 | Carpenter | F24F 11/0008 165/251 |
| 6,355,091 | B1 | * | 3/2002 | Felber | F24F 3/1411 95/10 |
| 6,612,923 | B1 | * | 9/2003 | Flynn | F24F 13/04 454/261 |
| 6,629,886 | B1 | * | 10/2003 | Estepp | F24F 11/043 454/229 |
| 7,130,757 | B2 | * | 10/2006 | Corwin | G08C 17/00 702/127 |
| 2001/0029535 | A1 | * | 10/2001 | Hirano | G01N 1/2202 709/224 |
| 2003/0181158 | A1 | * | 9/2003 | Schell | F24F 3/0442 454/229 |
| 2007/0084939 | A1 | * | 4/2007 | Liu | B64D 13/00 236/91 D |
| 2013/0045671 | A1 | * | 2/2013 | Apple | F24F 11/0001 454/239 |

FOREIGN PATENT DOCUMENTS

| | | |
|---|---|---|
| JP | 2005-299969 A | 10/2005 |
| KR | 10-2010-0086781 A | 8/2010 |
| WO | 2011-119091 A1 | 9/2011 |

OTHER PUBLICATIONS

International Search Report, and Written Opinion of the International Search Authority International Application No. PCT/US2013/058978 (KIPO)(dated Dec. 23, 2013).

English language machine translation of JP2005-299969, (Oct. 27, 2005).

English language machine translation of KR10-2010-0086781, (Aug. 2, 2010).

* cited by examiner

CLIMATE SMART FAN VENTILATION

TECHNICAL FIELD

The preferred embodiments relate to supply ventilation systems for dwellings such as residential, multifamily, and small commercial buildings, and more particularly to a system for use with supply ventilation or in combination with balanced ventilation.

BACKGROUND ART

Residential and commercial buildings and occupation habits differ from the past. For example, Americans spend 90% of their time indoors. As another example, building envelopes are increasingly tight. As still another example, materials used, and functional use of space where people live, have been changing in response to changes in people's needs.

The combined impact of more time indoors, tighter buildings, and off gassing from new building, furniture, and other products are causing concerns that the air quality in residential dwelling and commercial work spaces create a risk to health. The Environmental Protection Agency (EPA) lists poor indoor air quality as the fourth largest environmental threat to the United States. Asthma is a serious chronic illness of children in the United States. Moisture related construction damage will continue as a potential problem and is an area where careful management is required. Because the proper application of residential ventilation can improve many of these indoor air quality/respiratory problems, building codes and programs are increasingly seeking building strategies that incorporate the fresh air requirement of the American Society of Heating and Refrigeration Engineers (ASHRAE) Standard 62.1 and 62.2.

In the ASHRAE 62.2 standard, there are three primary sets of requirements. The primary sets involve whole-house ventilation, local exhaust, and source control. Whole house ventilation is intended to dilute the unavoidable contaminant emissions from people, materials, and background processes. Local exhaust is intended to remove contaminants from those specific rooms (kitchens and bathrooms) in which sources are expected because of their design function. The rules may seem to be principally about ventilation, but the purpose of ventilation is to provide acceptable indoor air. Acceptable indoor air quality is when a substantial majority of occupants express no dissatisfaction with respect to odor and sensory irritation and, in which there are not likely to be contaminants at concentrations known to pose a health threat.

Ventilation is a method for delivering "fresh" outdoor air to inside spaces to assist in delivering acceptable indoor air quality. Natural ventilation is insufficient to meet the needs of acceptable air quality in tighter and more energy efficient buildings. In addition, natural ventilation is random in nature and is likely to under or over ventilate. As buildings get "tighter", as a result of energy efficiency (and other) efforts, there is an increasing need (and requirement) for a mechanical means of affirmative ventilation, as opposed to or in addition to traditional passive or random manners in which interior air passed (or leaked) to the exterior. Mechanical ventilation allows for planning and delivering the defined and measurable levels of air for providing acceptable air quality in the interior. Currently the above code programs mandating compliance to a fresh air standard are beginning to mandate testing of the amount of delivered air from the selected and installed system.

A growing number of building code, and above building code, programs are requiring mechanical ventilation for delivering acceptable indoor air quality for the occupants of residential (homes and apartments) dwellings. The presently best accepted standard for determining the levels of mechanical ventilation are ASHRAE Standard 62.1 (commercial buildings) and ASHRAE Standard 62.2 (residential buildings). There are product application issues and product cost issues with every current product seeking to provide general resolution for the ventilation of residential and small commercial applications. The issues of ventilation in hot, humid, and hot/humid climate zones present particularly difficult application questions and; consequently, cry out for intelligent product resolution.

In general, the market is calling for improved solutions that meet the requirements of improved air quality that:
  Have a lower first cost impact
  Have a lower long term energy cost impact
  Are simpler to understand and easier to install by contractors
  Are responsive to the space limitations of certain building types
  Are relatively easy to inspect and test and to meet the performance requirements while not causing "end of job" critical path construction scheduling issues due to red tags on construction from the failure of the product/installation to deliver the design flow of ventilation as per the code or program requirements.
  Are responsive to the issues of energy and comfort penalties from outside air
  Are responsive to the concerns related to the issues of bringing humid outdoor air inside the building
  Provide the designer and installer more flexibility on location of devices and terminals
  In which it is relatively easy to change the filter and otherwise maintain.

In addition, public policy makers have been turning their research and policy efforts toward capturing the low hanging, but ever elusive, energy improvement from existing homes, apartments, and small office buildings. As these buildings become more energy efficient, it will become a market imperative to have smart (and climate sensitive) fresh air ventilation solutions for keeping acceptable indoor air quality. The same demands for product applications will become louder and more strident as the complications of existing structures are added to the engineering issues associated with mechanical ventilation.

There are three basic methods of ventilation in buildings. They are: (1) exhaust ventilation only; (2) supply ventilation only; and (3) balanced ventilation. Each of these methods is described below.

Exhaust Ventilation Only Systems

Exhaust ventilation systems involve depressurizing the dwelling unit by extracting indoor air from the interior while make-up air infiltrates through leaks in the building envelope, open windows, or through intentional passive vents and penetrations.

Typically, an exhaust ventilation system is composed of a centrally located mechanical exhaust fan connected to several rooms (preferably rooms where pollutants tend to be generated, such as kitchens and bathrooms) through flexible or metal ducts. Spot ventilation exhaust fans ducted to the outside, installed in the bathroom but operated continuously can represent an exhaust ventilation system in its simplest form. Spot ventilation with a bath fan is the predominate form of exhaust only ventilation on the market—mostly because it is the least costly method.

Exhaust ventilation only systems are relatively simple and inexpensive to install. However, in climates with hot or humid weather, depressurization (exhaust only) can draw moist air into building wall cavities, where it may condense and cause moisture damage. Depressurization and its potential for negative outcomes is the primary reason why building scientists recommend other forms of mechanical ventilation in hot and humid climates.

Another concern is that depressurization also may draw pollutants, along with fresh air, into the dwelling unit. Radon and mold from a crawlspace, dust and allergens from an attic, fumes (primarily carbon monoxide) from a garage or adjacent parking area, or flue gases from a fireplace, gas-fired water heater, furnace or other combustion devices are primary concerns for indoor air quality.

Exhaust ventilation only systems can contribute to higher heating and cooling costs when compared with heat/energy-recovery systems because exhaust only systems do not temper or remove moisture from the make-up air before it enters the dwelling unit.

Supply Ventilation Only Systems

Supply ventilation only systems work by pressurizing the building or dwelling unit. A fan is used to draw outside air into the building, which is then dispersed through the living spaces typically by a dedicated duct system. Exhaust pathways are normally provided by building envelope leakage, and through stacks, flues, and other intentional penetrations. A typical supply ventilation system has a fan and duct system that introduces fresh air into usually one, but preferably several rooms of the dwelling unit that are occupied most often (e.g. bedrooms, living rooms), perhaps with adjustable window or wall vents in other rooms.

Supply ventilation only systems allow better control of the air that enters the living area than do exhaust ventilation systems. By pressurizing the unit, supply ventilation systems discourage the entry of pollutants from outside the living space and avoid back-drafting of combustion gases from fireplaces and appliances. Supply ventilation also allows outdoor air introduced into the dwelling unit to be filtered to remove pollen and dust, to be dehumidified to provide humidity control, and to mitigate radon entry or back-drafting problems.

Supply ventilation only systems are most applicable in hot or mixed climates. Because they pressurize the dwelling unit, supply ventilation systems have the potential to cause moisture problems in cold climates. In addition, in hot climates, supply ventilation systems may mix ambient heat and moisture with cooled (i.e., air-conditioned) interior conditions, creating an opportunity for microbial growth.

Like exhaust ventilation only systems, supply ventilation only systems do not temper or remove moisture from the make-up air before it enters the building. For this reason they may contribute to higher heating and cooling costs.

The vast majority of supply only ventilation systems utilize an ASHRAE 62.2 (described also, below) compliant electronic controller in conjunction with a mechanical damper and a duct that is connected to the return air system of an HVAC system. These systems, while popular, have several residual problems, some of which are listed below:

a. This product often cannot generate sufficient negative pressure to pull desired (calculated) fresh air from exterior. Insufficient air means that there may not be enough to provide dilution of indoor contaminates and may not be in alignment with the design standards of ASHRAE.

b. It is difficult and time consuming to measure air flow in these negative pressure systems. This will become more of an issue in future years as several important "Above Code Building Programs" will be requiring measurement of the air and compliance to the calculated measures. Consistent compliance with this method is problematic since testing typically takes place near the end of construction. This makes compliance a significant "critical path" issue and which will cause end of project complexity, problems, and expense if the ventilation system cannot perform to the code or the above code requirements or cannot be easily tested in a verifiable and repeatable format. Supply only systems offer almost certain performance failure as almost every installation underperforms to the design which increases the complexity of the end of the construction critical path.

c. This supply only method requires a larger fan (the central air handling unit) to induce the negative pressure and therefore has a significant energy penalty. While electro commutating motors (ECM) type motors may reduce the impact of the more frequent fan run times, in multifamily projects ECM motors are not currently available (and may never be available). This is the energy penalty issue.

d. In certain popular multifamily applications (e.g., where the pancake HVAC system-popular because of its space saving), the return air goes back to the plenum area which is so large that there is essentially no "negative pressure" build up; therefore, really no fresh air is delivered and none that can be measured in a fan testing methodology. This is a double negative—no fresh air and failing all performance test of delivering fresh air causing failure on performance of program delivery.

e. Measurement (required in the future) comes after power is "on" and near occupancy—so, failure to deliver sufficient fresh air means this measure is a high risk of failure during the middle of the critical path nearing occupancy when the time to recover is low.

f. Among available options for delivery of mechanical fresh air, supply only systems are comparatively inexpensive. However, even inexpensive systems have significant first cost investment and because they are tied to the HVAC system they have high operating and high life cycle costs. As "humidity and temperature" mitigation measures get added to the basics of supply only systems, the cost advantage dissipates.

g. An emerging problem for supply only systems using the HVAC system for delivery and dispersal of the fresh air is the energy penalty from the air handling unit fan. This impacts two ways. The 2012 IECC code calls for an ECM (super efficient) air handling unit motor (not likely on all projects) and energy modelers are beginning to think about the energy cost of the Air Handling Units (AHU's) run time for energy modeling and may give the buildings energy rating a severe penalty for this product feature, causing significant investment on another energy feature of the structure to compensate.

h. Mass amounts of ventilation in large multifamily buildings offer unique challenges where there is no building science research and no definitive understanding of the impacts of hot and humid air on the building. Bringing in uncontrolled temperature or uncontrolled humidity has the potential for negative impact—especially if 300 to 400 apartment units are each pulling 30 to 70 CFM into the structure at the same time. There is simply no research that indicates what the short or long term impact is and there is therefore uncertainly whether it can be known, or ever will be known.

i. Controller installations are complicated, expensive, and permit a likelihood of introducing mistakes.
j. It is hard to determine if the damper is not functioning or if it is functioning properly. This leads to higher maintenance costs or (more likely) poorer indoor air quality.

Balanced Ventilation Systems

Balanced ventilation systems neither pressurize nor depressurize the living space if properly designed and installed. Rather, they introduce and exhaust approximately equal quantities of fresh outside air and polluted inside air, respectively. Balanced ventilation systems are appropriate for all climates.

Balanced systems are usually more expensive to purchase, install, and operate than "supply only" or "exhaust only" systems.

A special type of balanced ventilation system adds a heat-recovery unit to the basic design. A heat-recovery unit reduces the heating and cooling costs of ventilation by transferring heat from the warm inside air being exhausted to the incoming fresh but cold outside air in the winter and just the opposite in the summer. Comfort is also improved because the supply air is tempered before delivery, reducing drafts. Some heat-recovery systems also transfer moisture—an advantage in warm, humid climates in the summer and cold climates in the winter. If these systems also transfer moisture, they are called Heat Recovery Ventilators (HRV's) and Energy Recovery Ventilators (ERV's). In hot and humid climates, the majority of Balanced Ventilation Systems are Energy Recovery Ventilators (ERV). For residential and small commercial applications that application has many virtues but has several significant negative impacts, including but not limited to the following:

a. ERV's are seen as expensive and high end solutions. High-end ERV's may have fairly effective operating characteristics but they are costly in single family applications (seldom selected) and, in addition to cost, they generally utilize too large a footprint for a space constrained multifamily application.
b. Small ERV's (e.g., designed with the multifamily market in mind) have lower cost but also lower effectiveness at heat transfer and generally they do not remove substantial amounts of humidity but re-inject vapor back into the space leaving the space with the potential for humidity build up.
c. ERV's are space constrained; larger ERV's typically must be located in the basement or attic. Small ERV's can be installed within a ceiling joist but they are space constrained in another way in that they typically cannot be installed in a kitchen or laundry room because of the potential to clog mechanisms with kitchen grease or because of kitchen or laundry room periodic levels of high humidity.
d. Small ERV's have poor heat and humidity transfer capability.
e. ERV's have higher maintenance expenses than other ventilation methodologies.
f. The net impact of small ERV's is that they do a good job of balanced ventilation but do not add much value on transferring heat or humidity, add significant first cost for the minimal added value and have very high maintenance costs.

As can be seen above, ventilation considerations when properly considered involve myriad factors and existing systems with attendant drawbacks. The preferred embodiments seek to improve upon the above drawbacks, as further explored below.

DISCLOSURE OF INVENTION

In one preferred embodiment, there is a supply ventilation system controller for locating at an interior of a building. The controller comprises circuitry for receiving a signal representative of exterior air temperature and circuitry for receiving a signal representative of exterior relative humidity. The controller also comprises circuitry for establishing at least a first range of acceptable temperature and circuitry for establishing at least a first range of acceptable relative humidity. The circuitry for providing an enable/disable signal to a ventilation exterior-to-interior supply fan is responsive to at least one of: (i) the signal representative of exterior air temperature indicating satisfaction of the first range of acceptable temperature; or (ii) the signal representative of exterior relative humidity indicating satisfaction of the first range of acceptable relative humidity.

Other aspects are also disclosed and claimed.

BRIEF DESCRIPTION OF DRAWINGS

The invention will be described in detail below by referring to the accompanying drawings:

FIG. 8A illustrates a top down view of a building floor plan and implementing an example of the CFV of FIG. 7A, while

DESCRIPTION OF EMBODIMENTS

By way of introduction, a preferred embodiment includes a Climate Sensing Control Module (CSCM), that controls an electromechanical fan, that is, an electrically (e.g., motor) driven fan, to selectively blow air (e.g., exterior ambient) into the (e.g., interior) conditioned space in response to constraints that determine when the fan is enabled at one or more speeds, the constraints being based on high and low temperature and high and low humidity. Because fans are manufactured in high volumes and are easy to build products, the CSCM provides the ability to combine with a standard fan, which is (essentially) never used for compliance to mechanical ventilation standards in hot and humid climates, to create a versatile family of supply fans systems and accessories that can be, and are herein, referred to as Climate Smart Ventilation Products. Note more specifically, therefore, fans are commonly used as "exhaust ventilation;" in contrast, the preferred embodiment product family uses the fan to power the movement of air outside to in—called "supply" ventilation or half of "balanced" ventilation. Different preferred embodiments are connected to sensors in a manner that differs among the embodiments, including sensors that are directly connected (attached to the CSCM on the fan box in question) sensors that are connected by wires and have a remote placement away from the fan and sensors that are wirelessly connected to the CSCM and the fan.

Figure 1:
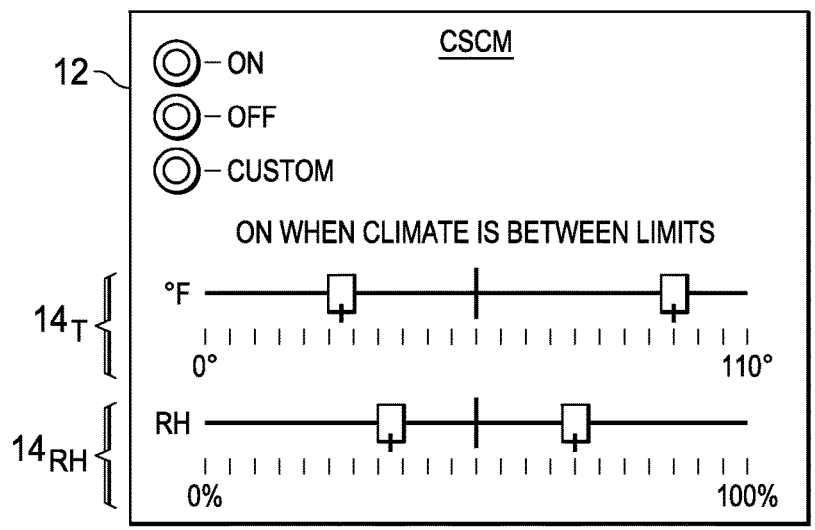
FIG. 1 illustrates a block diagram of a control panel 12 of a CSCM in accordance with a preferred embodiment.

FIG. 1 illustrates a block diagram of a control panel 12 of a CSCM in accordance with a preferred embodiment. The CSCM controls a fan (not shown but further discussed below), and in this regard the FIG. 1 interface has simple buttons (or some other type of controllable interface) to allow the product to control the fan so as deliver air in compliance to ASHRAE Standards and allows for the owner/occupant to have control over the indoor environment. Specifically, the buttons include a selection between one of three different operational modes, "On," "Off," or "Custom." The first two modes are generally self-explanatory with respect to controller devices, that is, in the "On" mode the fan is fully enabled as 100% on, and in the "Off" mode the fan is fully disabled as 100% off. In the "Custom" mode, however, the CSMC operates in response to sensors of the air and further to enable/disable the fan in response to whether parameters of sensed air, as discussed below, fall inside of or outside of parameter ranges defined by additional settings that are part of the CSMC. Specifically, these parameters preferably include temperature and relative humidity and, in this regard, the CSCS also includes apparatus $14_T$ for setting a temperature range and apparatus $14_{RH}$ for setting a relative humidity (RH) range. In the illustrated embodiment, apparatus $14_T$ includes two separate slider controls, one for setting a lower limit and one for setting an upper limit, to define a range of temperature. Similarly, apparatus 14 includes two separate slider controls, one for setting a lower limit and one for setting an upper limit, to define a range of relative humidity. As detailed throughout, a user may adjust these apparatus $14_T$ and $14_{RH}$ as settings to thereby define both a temperature range and a relative humidity (RH) range. Note that other manners of setting a range, such as having a single slider setting a limit either above or below the slider indication, also may be used. For example, therefore, a singular apparatus $14_{RH}$ may set a (RH) percentage, whereby the range is understood to be from that percentage up to 100% (or from that percentage down to 0%). In any event, in the Custom Mode the CSCM then monitors and detects when the exterior (or near-exterior) air satisfies both parameter ranges and, in response, the fan is enabled to supply air from exterior to interior, as further discussed below. To the contrary, if, in the Custom Mode, the CSCM detects that the exterior (or near-exterior) air fails to satisfy either of the parameter ranges, then the fan is disabled, thereby preventing air from being supplied via the system from exterior to interior, as also further discussed below. An embodiment also envisions digital controls that can be set by dial or arrow or by remote wireless access as well as coming straight from the factory with pre-set controls designed and built into the system.

Looking in more detail to a functional description of the CSCM, note that this name ("Climate Sensing Control Module") is an identification of what a preferred embodiment does and how it works, at least in the Custom Mode. Particularly, the CSCM senses "the climate" by measuring the ambient temperature conditions and relative humidity of the outside air, with reference to defined temperature and humidity ranges. Then, based on the ambient conditions of the measured outside air and the algorithms built into the CSCM controller, a controlled switch either provides or interrupts power to an associated electromechanical fan. Thus, the fan is either enabled or disabled based on the ambient conditions, the programming in the controller, and the desires of the person who sets the Mode and ranges on the parameter choices available for that particular model/iteration of the controller. Note also that one skilled in the art may implement the CSCM using various technologies either now known or ascertainable, and may readily construct the form factor, appearance, mechanical and electrical interfaces, programmability, hardware and/or software, needed to effect the functionality and illustrations described herein, given the myriad functional and technical discussion of this document. The CSCM is also designed to work with other control technology as it is anticipated that there will be continued evolution of sensors and control options as time passes and that the technology will need to be in place to incorporate these changes into the fundamental operation of all Climate Sensing Ventilation Products.

As further detailed below, with the CSCM in the "Custom" position, the CSCM operates in a Custom Mode (or modes) to determine if the temperature/RH range settings are satisfied, and if so the fan is enabled to operate at a relatively high speed; conversely, if a range is not met, the fan in a first embodiment is fully disabled so there is no (zero) air or the fan in a second embodiment is operated at a reduced speed that delivers negligible to humans air flow, but the fan is actually engaged so that air continues to move pass the sensors so that such air may be periodically reevaluated to determine if the range settings later become satisfied. Note also that in the Custom Mode, and in the first embodiment, the fan is periodically enabled in a slow fan rotation assessment mode, described later, so that the ambient air is again sampled to periodically determine if the range settings later become satisfied.

Given the preceding discussion of the "Custom" position and corresponding Custom Mode, one example of how the CSCM might be programmed by configuring the temperature/RH is as follows:

Apparatus $14_T$ is set to define an outdoor temperature range for the fan to be enabled between 30 degrees Fahrenheit and 95 degrees Fahrenheit. Thus, when the air temperature satisfies this range (and humidity satisfies the range or limit defined by apparatus $14_{RH}$), the CSCM switch enables the fan so as to supply air to provide positive pressure and appropriate air into the home/apartment/small office building.

With the above setting, and when the outdoor temperature is >95 degrees or <30 degrees, however, the CSCM switch disables the fan, ceasing to deliver outside air to the structure. (see notes above about sensor air flow)

Apparatus $14_{RH}$ is set to define that when the relative humidity is >55%, the CSCM switch either disables the fan or enables it to operate relatively slowly, allowing only a very small amount of humid air to be mechanically pulled into the structure so as to be tested by the sensor(s).

Thus, a key benefit for the preferred embodiment design is to be able to limit (provide control over) the negative impact of hot, cold or humid outdoor air.

Given the above discussion of the CSCM, the preferred embodiments further give rise to a significant number of new Climate Sensing Ventilation Products (CSVP) and systems that can be created utilizing the CSCM. These products can be introduced as an entire family of "Climate Venting Solutions" and would fill a needed and currently empty niche in the marketplace for fresh air ventilation of new and existing buildings. There are ancillary products associated with ventilation needs that can support the CSVP offering and resolving the needs of good ventilation practice. There are significant issues with all existing competitive ventilation products on the market. The CSCM and the family of CSVP offerings based on the CSCM core is a smart, needed innovation that resolves or mitigates many of the issues with prior art or unaddressed problems discussed in the Background Of The Invention section or those known in the art.

The CSCM preferably includes a small box electronic controller that has flexible options related to the needs of the market boxes with electro mechanical and/or circuit board internal mechanisms. Each of the options shown below (integrated, wired or wireless) has specific product application issues it is designed to resolve.

In a preferred embodiment, the CSCM includes, or electrically connects to, sensors that measure the ambient conditions of the outside air. For sensors tied directly to the module, the CSCM includes programming via circuitry, hardware and/or software to signal that the sensors need to sample the ambient conditions (either through a constant but very low flow of air or an intermittent burst of low speed air sufficient to allow a sampling and a determination by the sensors that ambient meet or do not meet conditions). This ventilation time and amount time can be captured and added to other scheduled ventilation time to measure total compliance to the ASHRAE standards.

Figure 2:
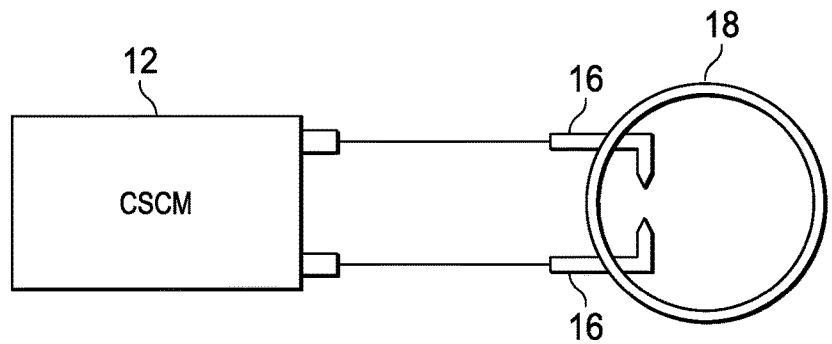
FIG. 2 is a simplified drawing of the CSCM attached to temperature/RH sensors 16.

FIG. 2 is a simplified drawing of the CSCM that is wire connected to temperature/RH sensors 16. Further, in the illustrated embodiment, the sensors 16 extend at least in part into the interior of an air duct 18, shown in FIG. 2 by cross-section or down its internal center, so that the sensors 16 tips, extending within the air duct interior, may detect their respective parameters of air passing through the duct 18.

Figure 3:
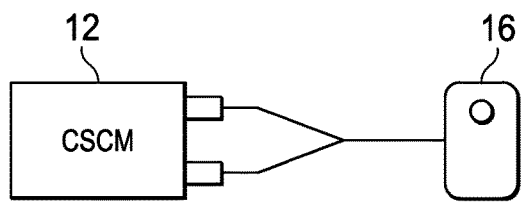
FIG. 3 is an example of a CSCM with a wired connection, via appropriate conductors, to temperature/RH sensors 16.

FIG. 3 is an example of a CSCM with a wired connection, via appropriate conductors, to temperature/RH sensors 16.

Figure 4:
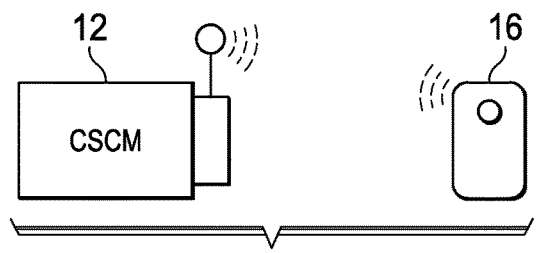
FIG. 4 is an example of a CSCM with a wireless connection, via appropriate transceivers and wireless protocol, to temperature/RH sensors 16.

FIG. 4 is an example of a CSCM with a wireless connection, via appropriate transceivers and wireless protocol, to temperature/RH sensors 16.

As described above, the CSCM also connects to, and controls, a fan. In one preferred embodiment, the CSCM alone may be connected, for example, on a duct segment $18_S$ that may be situated as a coupling between two pieces of duct, while controlling a remote fan that is located in another duct that is in fluid communication with the duct segment $18_S$. In another embodiment, the fan is "in line", that is, the fan is located within the interior of the associated air duct. Each of these approaches is discussed below.

Figure 5A:
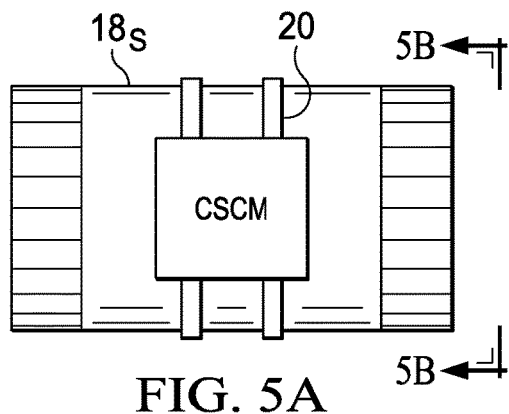
FIGS. 5A/5B and 6A/6B demonstrate variances in alternative preferred embodiments in how the CSCM can be manufactured and installed to deliver proper ventilation.
Figure 5B:
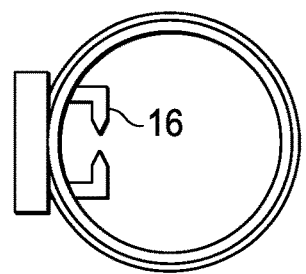

Further to the above, FIG. 5A illustrates a perspective view, and FIG. 5B a cross sectional view, of an air duct segment $18_S$, meaning a portion of duct that is relatively short (e.g., less than two feet, but long enough to facilitate coupling between two other pieces of duct, thereby giving rise to a length such as eight inches long). The diameter of the duct may be selected by one skilled in the art, so as to be compatible for coupling to other ducting in the intended environment (e.g., resident, multifamily, commercial). Although not shown below, the duct segment also should include an optional product attached to the end of the duct that holds a small piece of filtration media (MERV 6 or MERV 8) for appropriate filtration of the air (e.g., outdoor) passing into the structure. Also as shown in FIG. 5A, the CSCM is attached (e.g., by one or more bands 20) to the exterior of the air duct segment $18_S$. In addition, as shown in FIG. 5B, the CSCM is directly or structurally connected to its temperature/RH sensors 16, which extend within the interior of the duct segment, and the direct and electrical connection to the CSCM controller may pass through the duct wall to the exterior-affixed CSCM. This preferred embodiment combination allows for fast and simple installation in that the duct segment $18_S$ may be coupled to other ducts according to techniques known in the art, such as banding, taping, or otherwise. Once so installed, the CSCM is thereby positioned so as to provide easy control, using the value of temperature and RH humidity of air sensed in the duct segment $18_S$, to capture climate smart delivery of fresh air in compliance with ASHRAE Standards. However, additional provision is required to connect the CSCM to its associated fan, which is not shown in FIGS. 5A/5B but could be accomplished by wiring by one skilled in the art, further in view of the teachings herein.

Figure 6A:
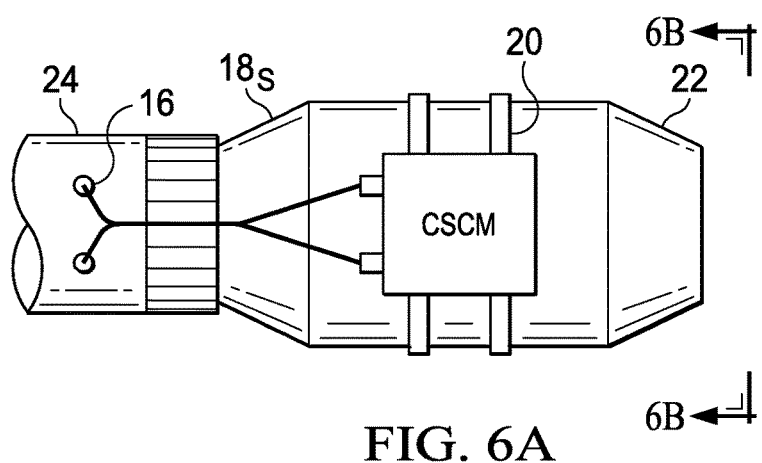

FIGS. 5A/5B and 6A/6B demonstrate variances in alternative preferred embodiments in how the CSCM can be manufactured and installed to deliver proper ventilation. The concept works both as a duct mounted device that attaches to a fan (FIGS. 5A/5B) and a fan with an elongated end that has a CSCM mounted at the supply end of the fan (FIGS. 6A/6B).

Figure 6B:
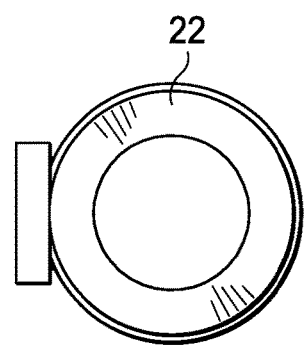

As shown in FIG. 6A, the CSCM is again attached (e.g., by one or more bands) to the exterior of the air duct segment $18_S$. In this embodiment, however, the temperature/RH sensors 16 may be located in the interior of an adjacent duct 24, and with a wire connection between the CSCM of the duct segment $18_S$ and the sensors 16 of the separate duct 24, whereby the wire connection may be in part or in whole in the interior of the ducts $18_S$ and 20. Alternatively, the sensors 16 may be located within the same duct segment $18_S$ to which the CSCM is attached, as shown above in FIGS. 5A/5B. In any event, FIG. 6B illustrates a cross-sectional view of the duct segment $18_S$, illustrating an interior area in which an in-line fan is located within the interior of the duct segment $18_S$ and is controlled by the CSMC. Thus, in FIGS. 6A/6B, the CSCM operates in response to the temperature and RH as sensed by the sensors 16 in the nearby duct 24, so as to operate the in-line fan 22. Once more, therefore, this alternative preferred embodiment allows for fast and simple installation and easy control, using the value of temperature and RH of air in the nearby duct, to capture climate smart delivery of fresh air in compliance with ASHRAE Standards.

Having described and demonstrated various apparatus configurations, attention is now redirected to additional functional operations of certain preferred embodiment, where certain of these operations may be selected, for example, by the above-introduced choice of the "On," "Off," or "Custom" selections (see FIG. 1), although other manners may be ascertained by one skilled in the art.

In a first CSCM preferred embodiment option, the CSCM controls the associated fan to operate at a very low and continuous speed. This means that a very low amount of continuous air (e.g., preferably 8 to 10 CFM air delivery) will be pulled by the fan from the outside—past the sensors 16 and into the building structure—on a constant basis. This way the temperature and RH sensors 16 will always have a selection of outside/ambient air. In response to the temperature and RH of this ambient (or near ambient) air, the CSCM determines if the conditions are met as by the settings established by apparatus $14_T$ and $14_{RH}$ of FIG. 1, and if such conditions are met the CSCM controls the fan to run at a higher CFM level; if either of those conditions is not met, however, then in this first option, the CSCM controls the fan to continue to operate at a very low operational level.

In a second CSCM preferred embodiment option, the CSCM operates with an "assessment mode" that includes either a fixed, or programmable, sampling interval at which time the fan is operated to draw in ambient air for temperature and RH testing by the sensors 16. Thus, this CSCM may include an integrated circuit or the like with a duration time and a CFM amount. For example, the CSCM may call for a low speed fan operation for 60 seconds during every 15 minute daily time period; in this 60 second duration, the fan will pull sufficient air to pass over the temperature/RH sensors 16, allowing them to accurately measure if the conditions established by apparatus $14_T$ and $14_{RH}$ of FIG. 1 are met, in which case the fan speed is increased to run normally, whereas if the conditions are not met the fan remains in the periodic-sampling assessment mode.

In an assessment mode, the operational embodiment of the outside assessment technology may be crucial to the success of the applied product. It is the constant small assessment or intermittent assessment of outdoor air that allows the CSCM to sense conditions and allow desirable air to flow into the home, apartment or business.

Note that a virtue of either of the above-described options is that these operating mode ventilation airflows can be incorporated into the compliance strategy to the standards of how much fresh air is required.

Given the above, one skilled in the art will appreciate that the CSCM preferably is a small electronic device/controller that connects to a fan or an air duct. The CSCM apparatus $14_T$ and $14_{RH}$ controls various devices (fan(s)), attached to the CSCM, to operate as either "on" or "off" depending on the climate conditions (properties of the air) of the air passing by the temperature and humidity sensors 16. The sensors can be connected in one of three ways:

Integrated directly with the CSCM which attaches to a device or a duct.
Connected by a wire to a sensor package that would be mounted remotely (near or far from the control module).
Connected with a wireless sensor package that is mounted remotely.

The temperature and the humidity (and possibly other air attributes, in alternative preferred embodiments)—of the air passing the sensor(s) 16 goes to the algorithms incorporated into the CSCM that determines whether the switch to a device is "on" or "off". The operation of the preferred embodiment CSCM switches on and off an electromechanical fan 22 and when enabled by the switch the fan 22 supplies fresh outside air to the home or apartment unit or to a small commercial building. Further, the variations of climate conditions that can be determined and selected to control the switch are infinite. When air is pulled through the fan/duct and over the sensors 16, the CSCM senses the "climate condition" of the outside air which provides the necessary information to the switch to turn "off" or to turn "on". The switch enables or disables an electromechanical fan 22 that is properly sized to deliver an amount of air that meets the requirements for acceptable indoor air quality. In this way, the CSCM operates to either provide, or to not provide, fresh air to the conditioned space or not—based on the climate conditions.

The present inventor recognizes that electromechanically delivered fresh air is not always desirable. Sometimes outside air is very hot and adds "cooling, heating or dehumidification load" to the HVAC system, "discomfort" to the residents, "energy penalty" to the utility bill and to the "electric power grid". Sometimes outdoor air temperature is very cold offering the similar set of disadvantages. Sometimes, outdoor air is very humid. Humid air has the potential for energy penalty, discomfort and too much humidity can impact the structural durability of the building. In view thereof, a benefit of the CSCM, implemented in combination with a fan, is that it gives the owner or resident the ability to determine the characteristics (within a defined range) of fresh air that are acceptable to them. The CSCM can be integrated with a constant or intermittent fan control to provide ventilation to residential (single and multifamily applications) and commercial applications. Commercial applications using this product will usually be found in buildings less than 100,000 square feet and less than or equal to 4 stories tall.

Different embodiments of the CSCM have many useful control options. Set any high limit outdoor temperature, set any low limit outdoor temperature, set any limit outdoor relative humidity and the CSCM will operate within those control set points.

The CSCM also may monitor other controllable measures as sensor technology for other outside air conditions becomes available, accurate, and affordable. For example, the ability to monitor and enable/disable ventilation in response to outdoor particulate levels, such as based on pollen counts, could have an extremely beneficial impact on a substantial portion of the population. It is envisioned that there are an infinite number of potential variations of conditions that designers and occupants might want to use to improve their indoor environment. Buildings vary greatly and so do occupants. As additional sensors are added, pollen sensors for example, the options given to occupants to change the variable mix of fresh to existing air in a structure increases. Existing buildings soon will be subject to increasing scrutiny for energy efficiency and indoor air quality improvement. There will need to be a larger number of parameters or variables that incorporate varying levels of acceptable temperature and humidity. Adding ways to incorporate mixed air (i.e. tempering the incoming air with the air from the structure to moderate extremes of hot and cold or to mix more humid air with drier inside air may allow a wider range on acceptable levels of outside humidity) may be important variants to designers of systems using the CSCM and the CSVP line.

Figure 7A:
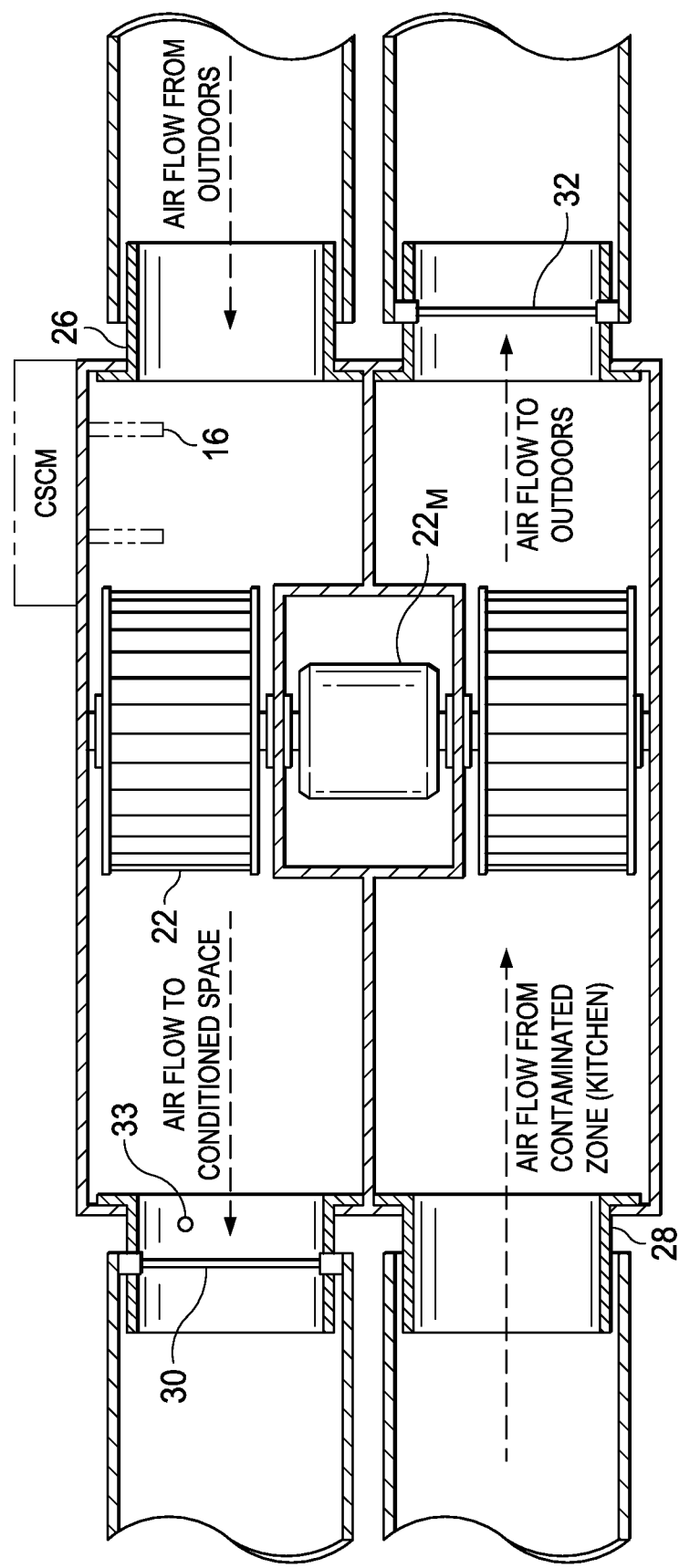
FIG. 7A illustrates a cross-sectional view of a CSCM and associated fan incorporated into a Climate Fan Ventilator (CFV).

FIG. 7A illustrates a cross-sectional view of another preferred embodiment, in which the CSCM and associated fan are incorporated into a system, referred to herein as a Climate Fan Ventilator (CFV). The CFV offers the entry of a new category of product into the ventilation market and will compete directly with the low cost ERV and Heat Recovery Ventilator (HRV) market. The CFV has an integrated bi-directional fan 22 (or two fans) that exhausts and supplies air in the same set of operations. The CFV has a supply duct 26 that pulls fresh outdoor air from outside through the CFV to the inside, and in this operation the CSCM operates the supply side as discussed above, that is, to supply air when temperature and RH conditions are met. The CFV also has an exhaust duct 28 that pulls stale air from the structure to the exterior. Preferably, supply and exhaust are an integrated operation—meaning that the supply and exhaust fan(s) operate at the same time—balancing the exhaust air with new replacement supply.

The CFV has extra value in the multifamily market where space is limited and cost impacts are significant. Clever application of the in unit supply and exhaust outlet terminals may allow the developer to further reduce cost by meeting both the "whole house" and the "kitchen local exhaust" requirements of ASHRAE 62.2 standard. The supply side of the CSV has an integrated CSCM and the exhaust vents can be located in the kitchen. Such a design allows for the product (in various iterations) to solve the kitchen "intermittent" ventilation requirements and the whole house constant fresh air requirements. This implementation allows for the reduction of one fairly expensive fan, is a faster/simpler installation, offers improved flexibility of exhaust venting in the kitchen, separation of supply and exhaust (better mixture of the fresh air system within the building envelope).

More specifically with respect to FIG. 7A, along the top horizontal half of the Figure and from right-to-left, a supply air path is shown from outdoors toward the interior, whereby the air passes by the CSCM sensors 16 as described above, and a fan motor $22_M$ is controlled also by the CSCM in response to temperature and RH. A back draft damper 30 is preferably located at the end of the supply air path. Continuing with the Figure, along the bottom horizontal half and from left-to-right is illustrated an exhaust air path from air-conditioned indoors (e.g., kitchen) to the exterior. A back draft damper 32 is preferably located at the end of the exhaust air path. Note that the FIG. 7 CFV can serve dual purposes by delivering more than one ventilation requirement. Initially, the CFV is designed to deliver both whole house ventilation (balanced) and also—because of return air grille placement can (with an integrated—on/off switch) can go into override mode and also meet the ASHRAE requirements for local kitchen exhaust. Note: depending on space limitations and other factors, all fans in a home or an apartment could be tied to one CFV.

Note also in connection with the CFV of FIG. 7A, in an alternative embodiment a two fan operation may provide the same or comparable benefits as the illustrated "bi-directional" fan. Thus, alternative embodiments are contemplated, considering for example factors such as cost, performance specifications, durability and operating costs between the two choices, as there are also are likely tradeoffs that should be considered by one skilled in the art.

Figure 7B:
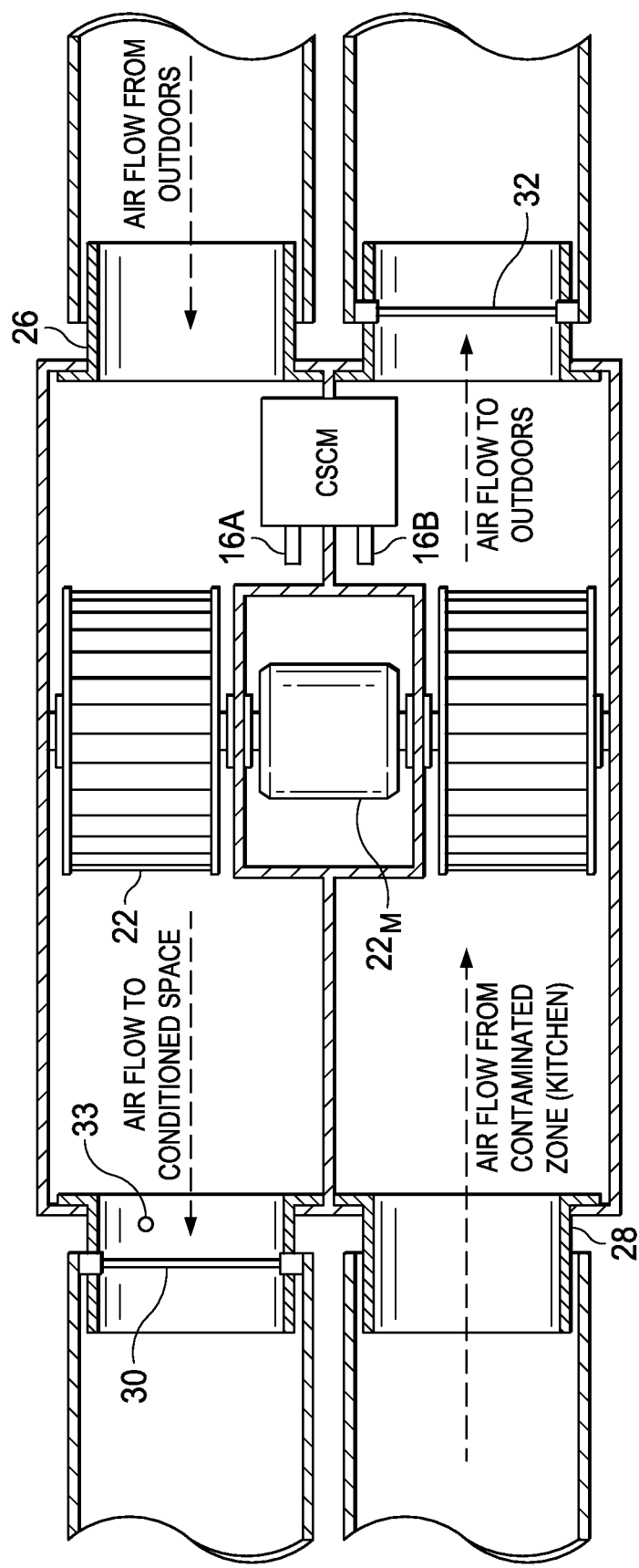
FIG. 7B illustrates a cross-sectional view of a CSCM and associated fan incorporated into an alternative CFV, wherein the CSCM is responsive to both air sensed coming from outdoors and air sensed going to outdoors.

FIG. 7B illustrates a cross-sectional view of a CSCM and associated fan incorporated into an alternative CFV, wherein the CSCM is responsive to both air sensed coming from outdoors and air sensed going to outdoors. Thus, as shown, the CSCM is located so as to have: (1) a first (or first set of) sensor 16A to sense air coming from the outdoors and heading to the indoors, and (2) a second (or second set of) sensor 16B to sense air coming from the indoors and heading to the outdoors. In this way, the CSCM can sense one or both of temperature or RH from one or both of sensor 16A and sensor 16B, and control fan motor $22_M$ accordingly (or separate fan motors, one for the upper air path and one for the lower air path). A benefit to having both measures in this regard is a preferred embodiment may use the information from the inside humidity to inform whether the inside is too humid or not and how the inside air compares to the outside air. For example there will be important examples where sensor 16B determines the indoor humidity is high, while sensor 16A determines the outdoor humidity is relatively low, and with the CSCM thereby able to ascertain from the difference or relative values of outdoor and indoor the CSCM may run the ventilation at full speed to lower the humidity in the inside by properly mixing drier outside air with the humid indoor air. This will increasingly occur in mild shoulder seasons where the HVAC load is lessoned and the AC system will not run and remove humidity, that is, the CFV may assist humidity conditions without the burden on the HVAC (or where the HVAC simply is not addressing the burden because it is not running based purely on considerations of temperature). In other words, in such a case, the AC many not reduce humidity build up inside the structure, where the CFV product line offers humidity removal as an ancillary benefit.

Figure 8A:
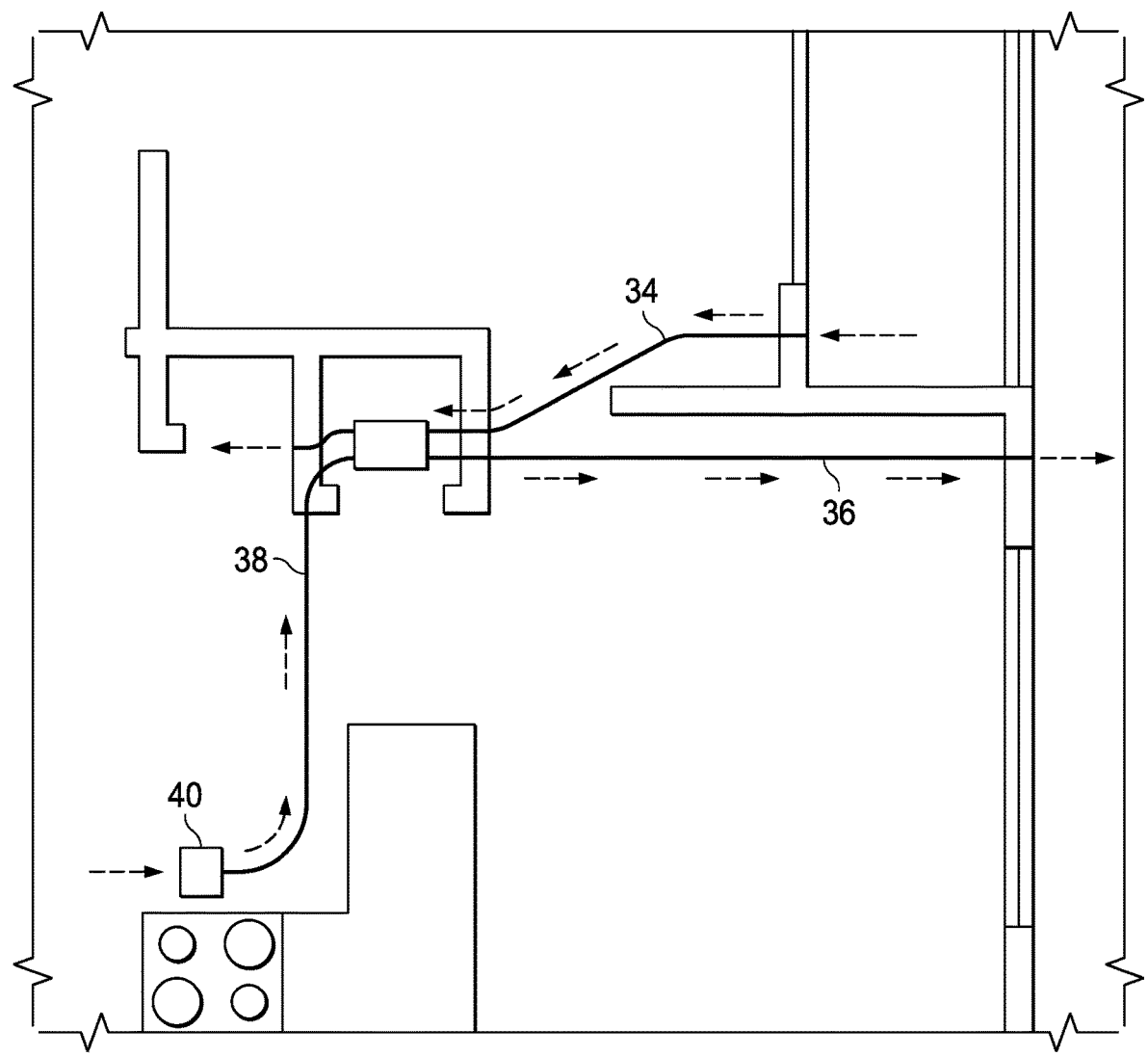

FIG. 8A illustrates a top down view of a building floor plan and implementing an example of the CFV of FIG. 7, as included in a typical living environment. FIGS. 8B through 8F show enlarged portions of various areas from FIG. 8A, thereby illustrating additional apparatus for connecting the ducts so as to allow air passage in the appropriate direction.

In FIG. 8A, the CFV is shown as a "Bi-Directional Fan" located in a Mechanical Room, with ducting or comparable conduits to allow bi-directional air flow, that is, supply air drawn through ducting 34 from the exterior and supplied to the interior, and exhaust air drawn through ducting 36 from the interior and exhausted to the exterior. More particularly, when the CSCM determines that the appropriate temperature and RH conditions are met (e.g., sometimes by sensing that indoor humidity is higher that outdoor humidity if equipped with an internal RH sensor as described in connection with FIG. 7B), then ventilation air is supplied from exterior to interior in one duct system, while at the same time ventilation air is exhausted from interior to exterior in another duct system.

Figure 8B:
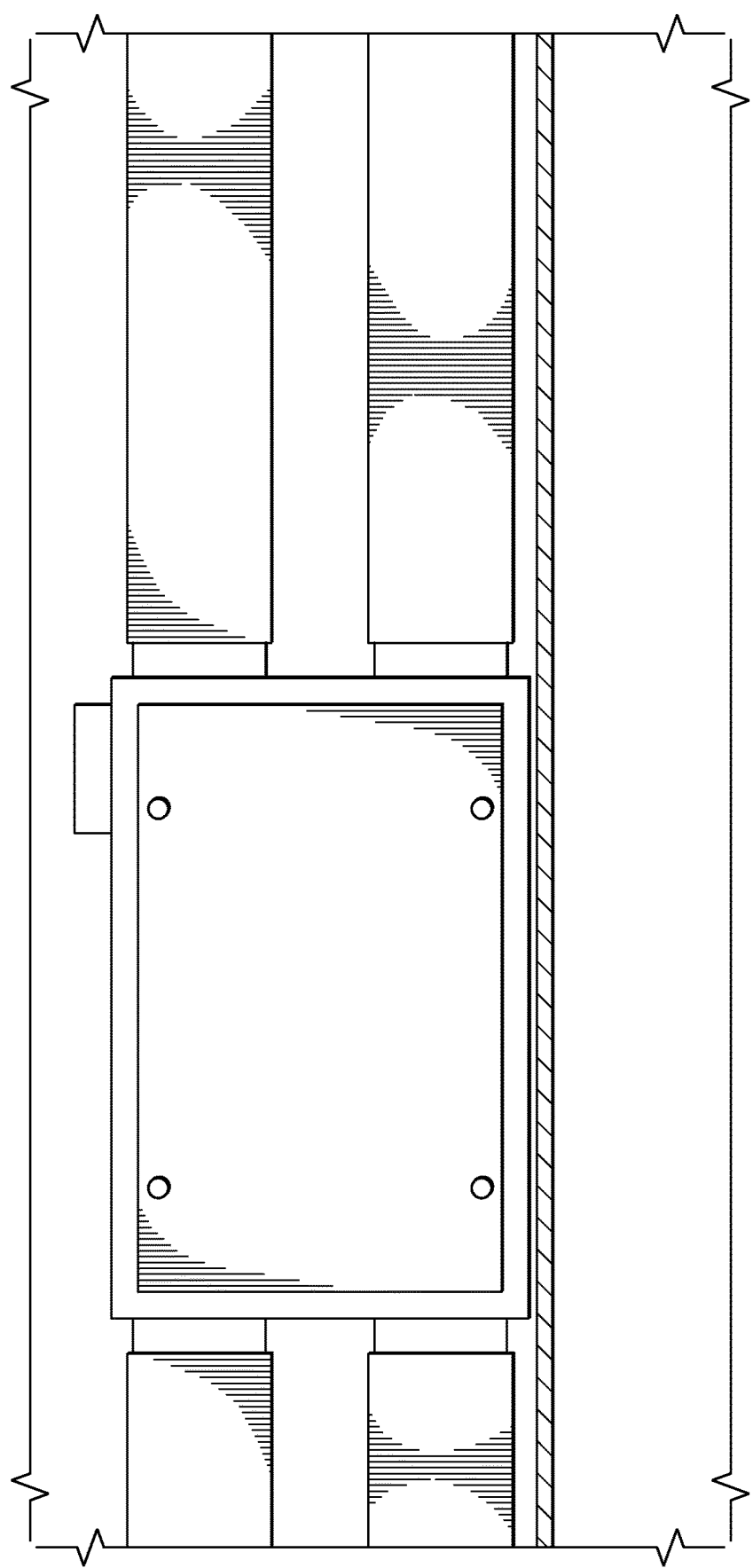
FIGS. 8B through 8F show enlarged portions of various areas from FIG. 8A.
Figure 8C:
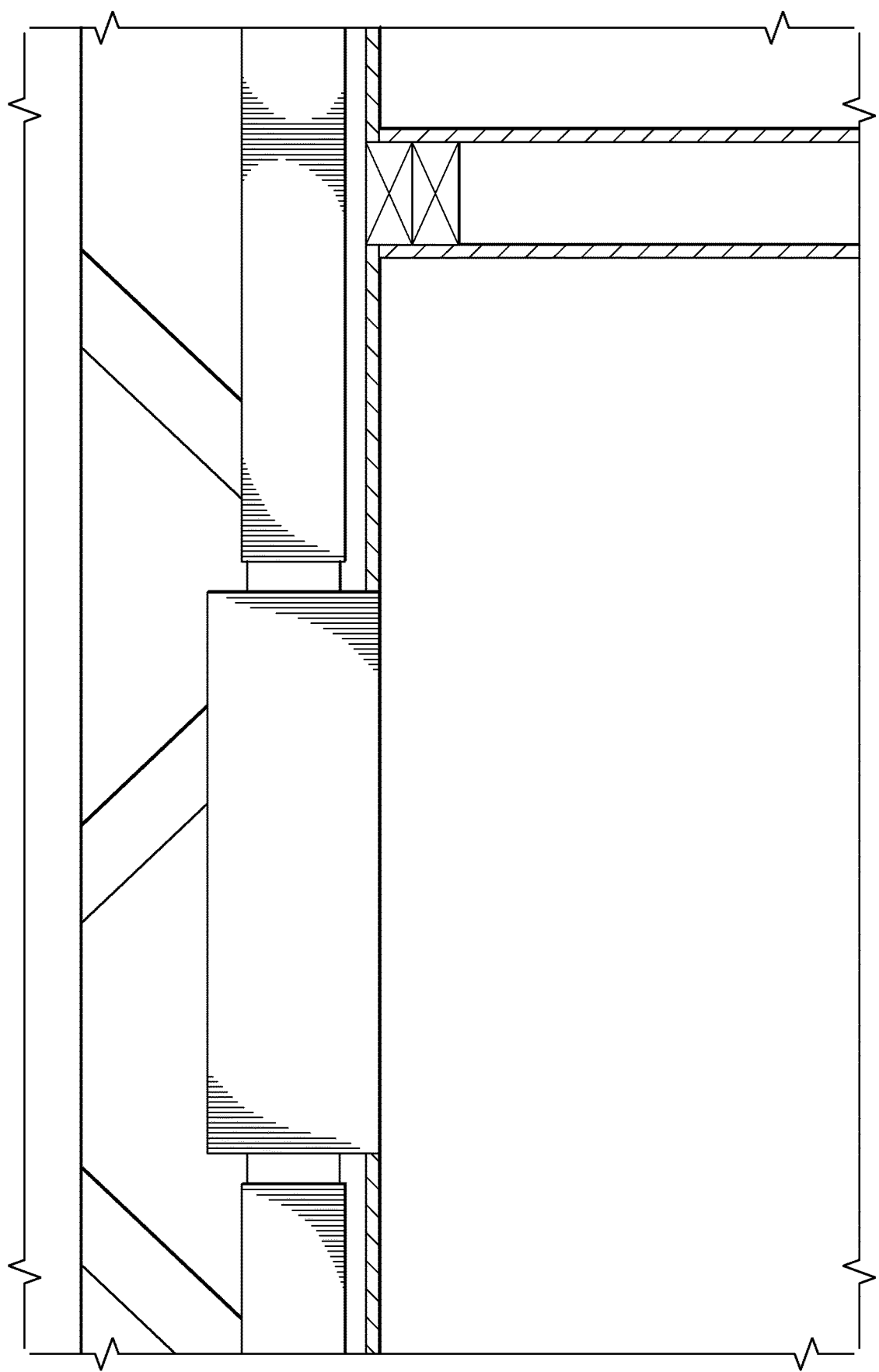
Figure 8D:
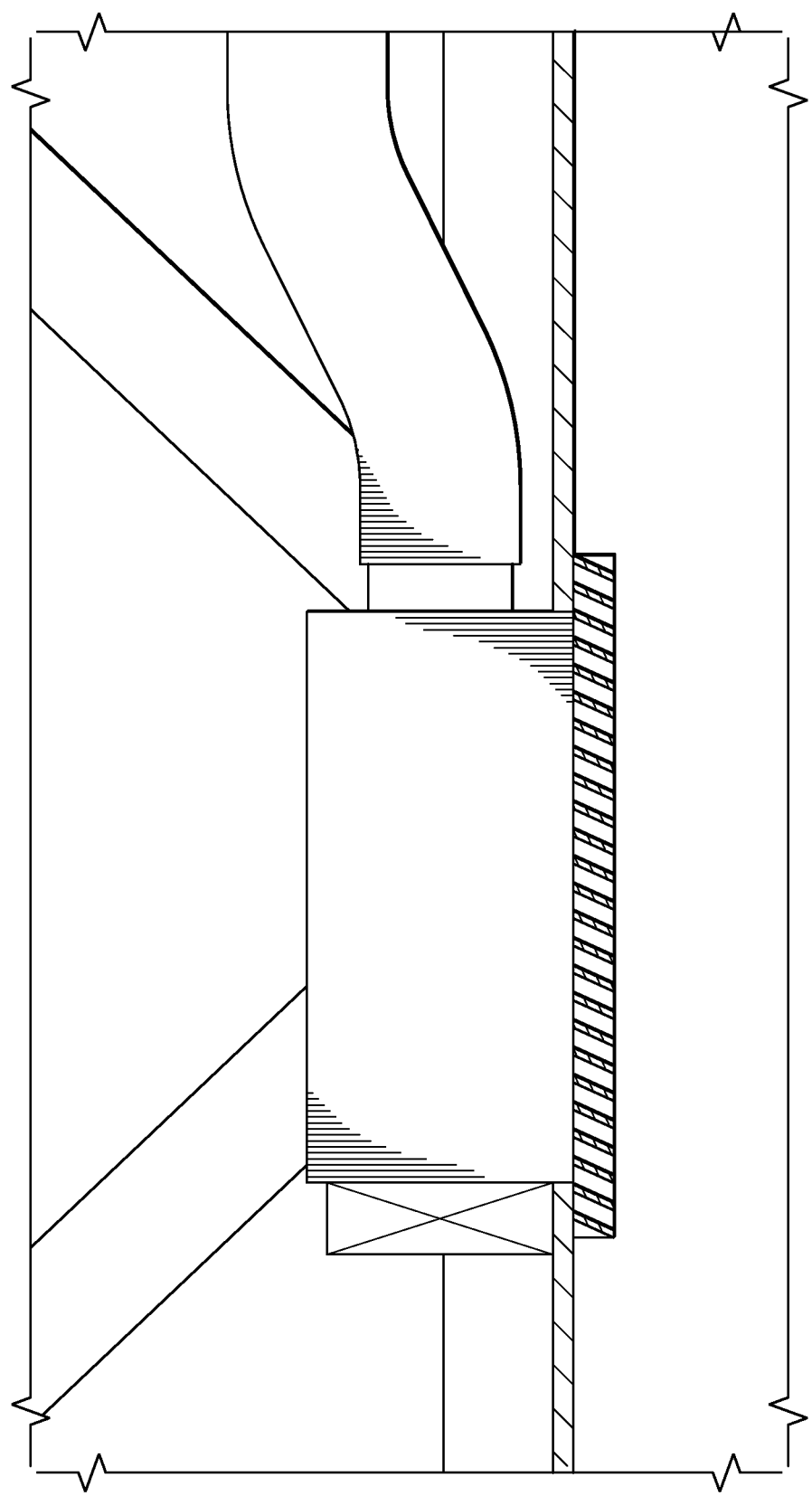
Figure 8E:
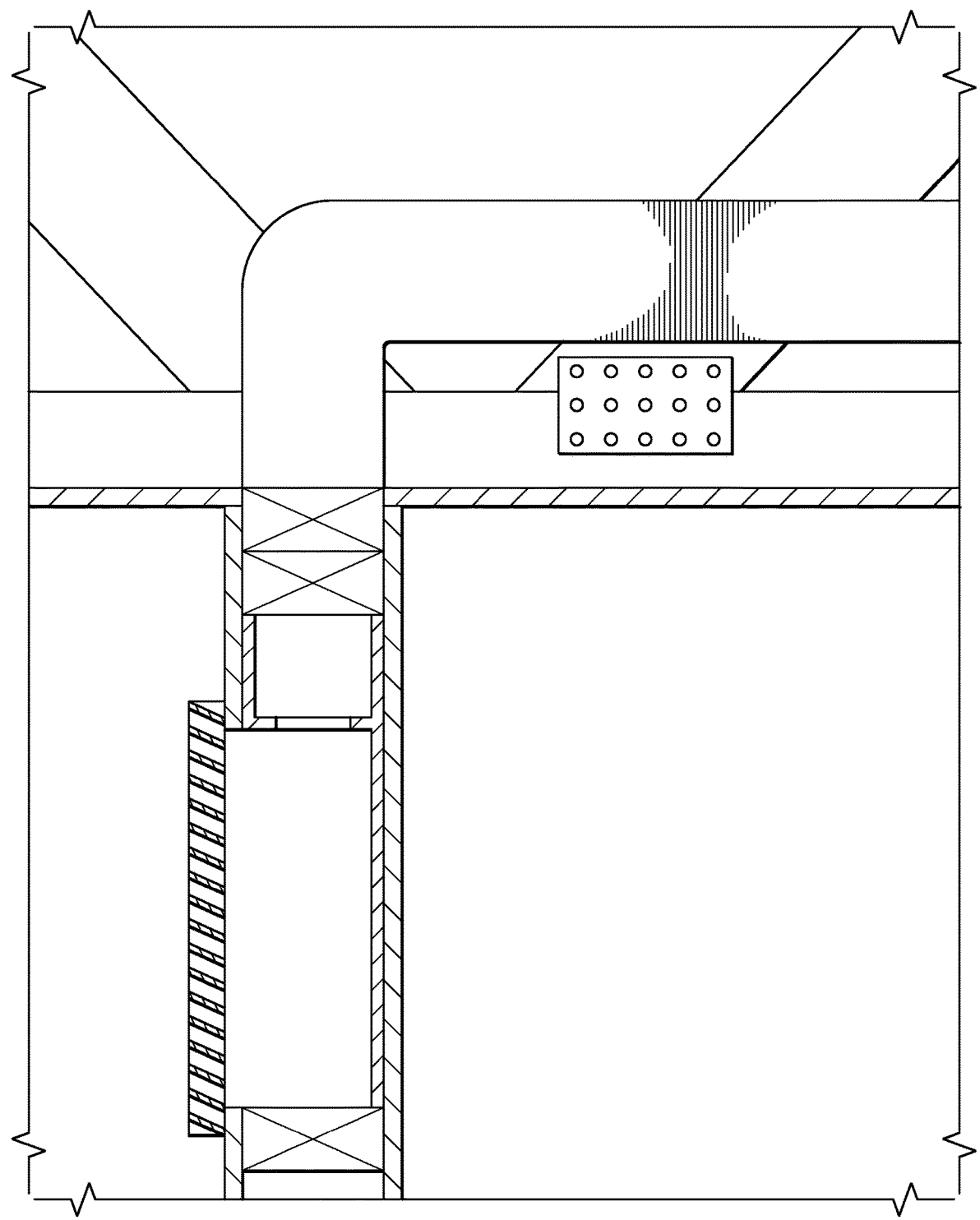
Figure 8F:
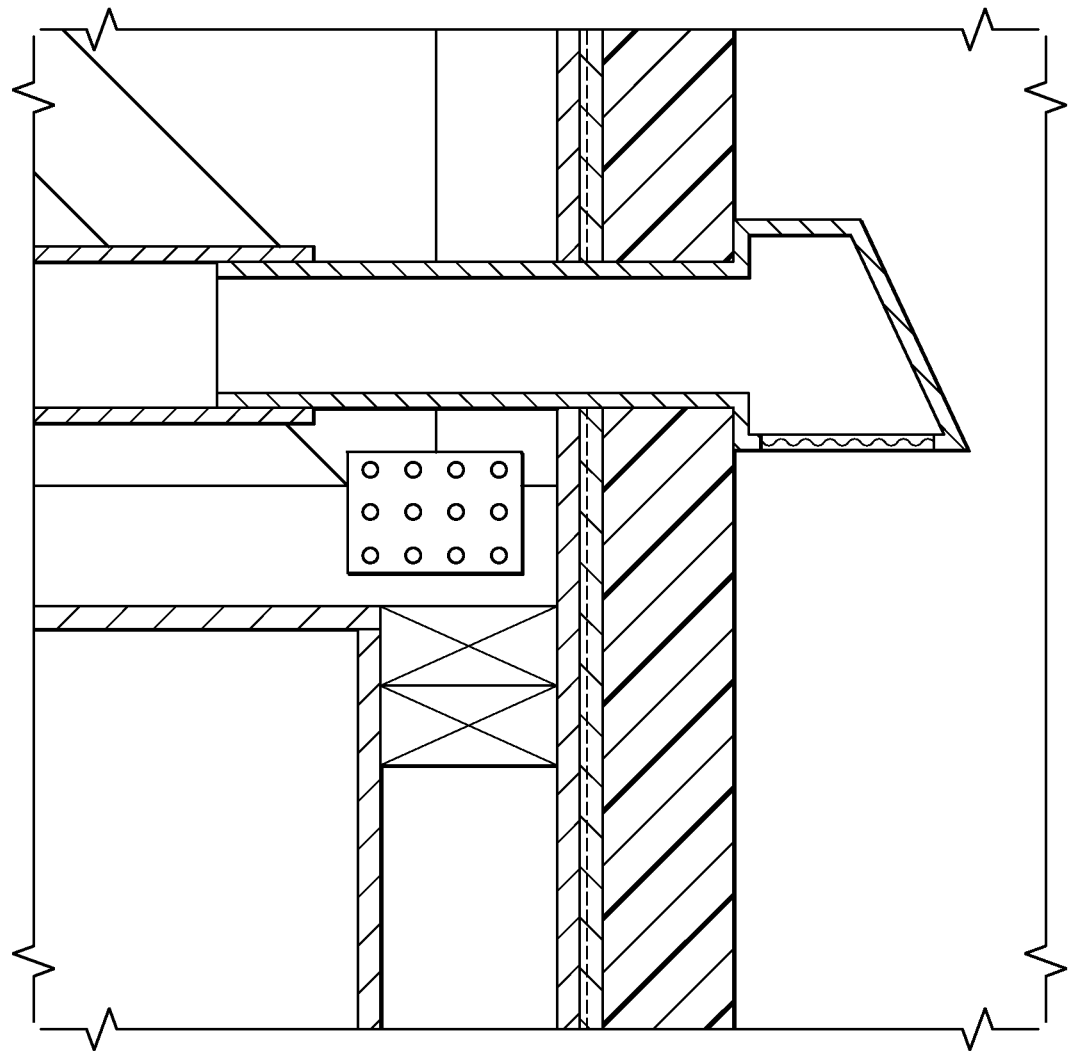

FIG. 8B illustrates a worm's (bottom) perspective view, and FIG. 8C illustrates a side view, of the FIG. 7A CFV as implemented in the system of FIG. 8A. With respect to the supply of air from exterior to interior in FIG. 8B, the inlet portion of the CFV fan is sourced from the exterior (e.g., Balcony) as further shown in FIG. 8F where a wall cap is located and operable to draw exterior air through an exterior wall into a corresponding air duct. Further, the fresh supply air drawn by the CFV is then connected via a duct to the apparatus and area shown in FIG. 8E.

With respect to the exhausting of air from interior to exterior in FIG. 8A, the inlet portion of the CFV fan is sourced via a duct 38 from the Kitchen, and more particularly may be provided by a grill and associated apparatus 40 also used in connection with the elimination of kitchen smoke and odors, as further shown by an above-finished ceiling box mounted in connection with a grill in FIG. 8C. Moreover, the exhausted air is then provided via the duct 36 (FIG. 8A) by the CFV van to the exterior, as may also be achieved via apparatus of the type shown in FIG. 8F.

Given the above, one skilled in the art should now appreciate that the preferred embodiments address, mitigate, and solve significant industry problems, such as the following:

a. Price—the CFV preferred embodiments may well be the price leader in their category. They offer protection against extremes of temperature and humidity in the ambient air at the lowest total initial cost (a significant advantage), compete effectively for lowest total operating costs and will be the clear leader in ROI and lifecycle costs.

b. Location in unit—The product has no limitations on the power of the fan that can be installed in the system and that allows it to have extreme flexibility on location. Early implementations may have lower powered fans to get a product to market fast. But, the family of products will have high static fans that for a small additional cost can be installed in any location of the structure and still pull and push the air to where it is needed.
  i. Size—The CSVP will be very size compact and the CSCM and fan sections will be smaller than competitive offerings that attempt to deal with climate with air/air heat exchangers or who do not attempt to deal with ambient climate issues at all.
  ii. Temperature and humidity and durability impacts are mitigated by the CSCM and the ability of the programming to still allow for compliance or near compliance to fresh air guidelines is a major plus for the product offering.
  iii. Installation issues—The product, in many cases, will require only minimal installation guidelines and instructions. The self-contained units (with integrated CSCM) only need electrical power and duct connections to work. This compares with the often complicated wiring and return air ducting and commissioning required by many supply only systems.
  iv. Supply only—The CSVP family will be less expensive first cost (needs only to add a CSCM versus very expensive (e.g., Honeywell) thermostat+remote controller), less expensive operating cost (needs not to have AHU to run to operate the ventilation system), less impact on code compliance (ECM motor requirement), less impact on energy modeling (see new requirements for how energy models should manage ventilation systems), better control of ambient conditions and lowest lifecycle costs.
  v. Balanced offering—CSVP apparatus creates a new offering for Balanced Ventilation that creates a solution for all climate zones on how best (and when best) to bring in outside air. The CFV is a breakthrough product offering a smart and lower cost alternative to the HRV/ERV product offerings. CFV's give essentially the same benefit with vastly lower initial first costs and the best long term return on investment for the owner of the products. In addition, because of the design and installation flexibility, the CFV can serve two ventilation purposes (local exhaust—i.e., kitchen and whole house exhaust at the same time) thus saving on installation cost, space, operating expense, and life cycle costs.

One skilled in the art should now appreciate that the preferred embodiments also provide numerous benefits, such as the following:
a. Low cost and low operating energy use when using a small, efficient operating fan.
b. The fan preferably has low sone ratings and will be quiet to operating.
c. It will be easy to measure the amount of air delivered by the preferred embodiment to ensure compliance with program requirements.
d. The preferred embodiment can be installed in almost any location within the structure.
e. The preferred embodiment solves the exhaust only issue when trickle vents are not installed—bringing ambient air through walls and other interstitial spaces.
f. The preferred embodiment addresses MEP and HVAC load calculation concerns on comfort issues and equipment sizing with relationship to temperature—high and low.
g. The preferred embodiment addresses MEP and HVAC load calculation concerns on comfort issues and equipment sizing with relationship the comfort issues on humidity.
h. The preferred embodiment will be simple to understand, easy to design for projects and easy to install and commission.
i. The preferred embodiment has applications particularly in Hot and Humid Climate Zones—but the CFV can be used in any climate zone.
j. The preferred embodiment addresses code and energy modeling relationships between the energy penalty and traditional supply only ventilation.
k. In "supply only" implementation, the preferred embodiment controls high and low temperature air and high humidity air.
l. With proper fan selection, the CSCM fan can deliver the required CFM, required by the design standards of ASHRAE.
m. The preferred embodiment can reduce the number of wall penetration with careful design.
n. The preferred embodiment will have lower electric use than an AHU because the fan horsepower of an AHU by definition is significantly greater than the fan horsepower of the CFV or the CSF or the entire product family as visualized by the embodiment.
o. In a configuration to provide "balanced" ventilation, the supply fan can bypass the air in cracks and crevices and reduce potential negative impact on mold creation.
p. Much better than "exhaust only".
q. Low initial cost and low operating cost
r. Low system installation cost
s. Easy to understand and control The preferred embodiments also provide for additional product variations and applications in various product lines, such as the following:
1. CSCM with whole house constant fan—
   a. Fan connector with sensors and control.
   b. Fan connector with (two way blowing fan) with sensors and control.
   c. Size of fan—location of outlet—means can comply with whole house and kitchen exhaust requirements with same fan (save time and money). The CSCM may include a timer for wider supply constant at 24 hour controller.
   d. With one fan the CSCM may supply constant.
   e. One motor fan in/out with CSCM and remote supply and return pickups.
2. Constant Fan (100 CFM) "in line" with ventilation of an apartment kitchen to a centrally located fan (sound resistant box) and vent to exterior (kitchen vent—solves problem of vent location and fire dampers)—preferably includes override switch in kitchen.
3. Two-speed fan in with vent return in kitchen and the CSCM can give constant fan out (kitchen) while tied to constant fan in (CSCM) and second speed in kitchen allows for more air during an event. (possible mounted Controller for "dial in" flow" allowing one practiced in the art to over design the CFM of the fan and yet dial in exactly the CFM performance required to conform to standards).

4. An "in and out", bi-directional or dual fan, (like the fans installed in ERV's) both moves air in and moves air out can be tied to whole house vent and to kitchen exhaust vent.
   a. In/out fan with the CSCM could deliver low cost balanced ventilation at vastly lower cost.
   b. Larger fans and duct sizes could be tied to create or market availability timer so that mechanical ventilation can be delivered by intermittent fan operation (may be add calculation for automated—occupancy or humidity—controlled fan).
   c. Fan with two-speed controls—low speeds for tandem whole house ventilation and high speed for ventilation of kitchen and in kitchen.
   d. 100 CFM fan—in and out and tied to standard 62.1 and 62.2 industry controllers
5. Using the CSCM with an in line fan or with a CFV offers all types of designer flexibility. By matching this new CSVP family with other and currently existing products, these new embodiments can expand the abilities of other ventilation controls to have a positive impact on indoor environments. There are a variety of product controllers that, integrated with the CSCM, give significant new flexibility to this market. This would better allow for ventilation during evening hours or to be programmed during the "away" time integrated with work. The product control strategy might be integrated into all the fans in the structure to accumulate the total fresh supply and exhaust air delivered and there are many variations of the 62 controller that give option on how a designer might plan for proper ventilation.
6. The product strategy assumes that with the proper design of controls the embodiment could perform constant ventilation at night time while normal residents would be asleep (e.g., midnight to 5 a.m.) or while normal commercial occupants would be out of the facility (e.g. 10 p.m. to 5 a.m.).
7. The embodiment allows for larger and more powerful CFM fans for larger single family and commercial structures allowing for both single point and multipoint terminations. In essence, a very inexpensive and durable ERV type device.

The preferred embodiment CSCM also may be used as described above, or with further modification, in an additional exterior wall mounted embodiment, as is now described in connection with additional figures. By way of introduction, the phrase "exterior wall" is intended to mean a dwelling/building wall that has an interior environment on one side of the wall and an exterior environment on the other side of the wall, as is labeled by way of example in FIG. 9, which shows a cross-section of such a wall.

Figure 9:
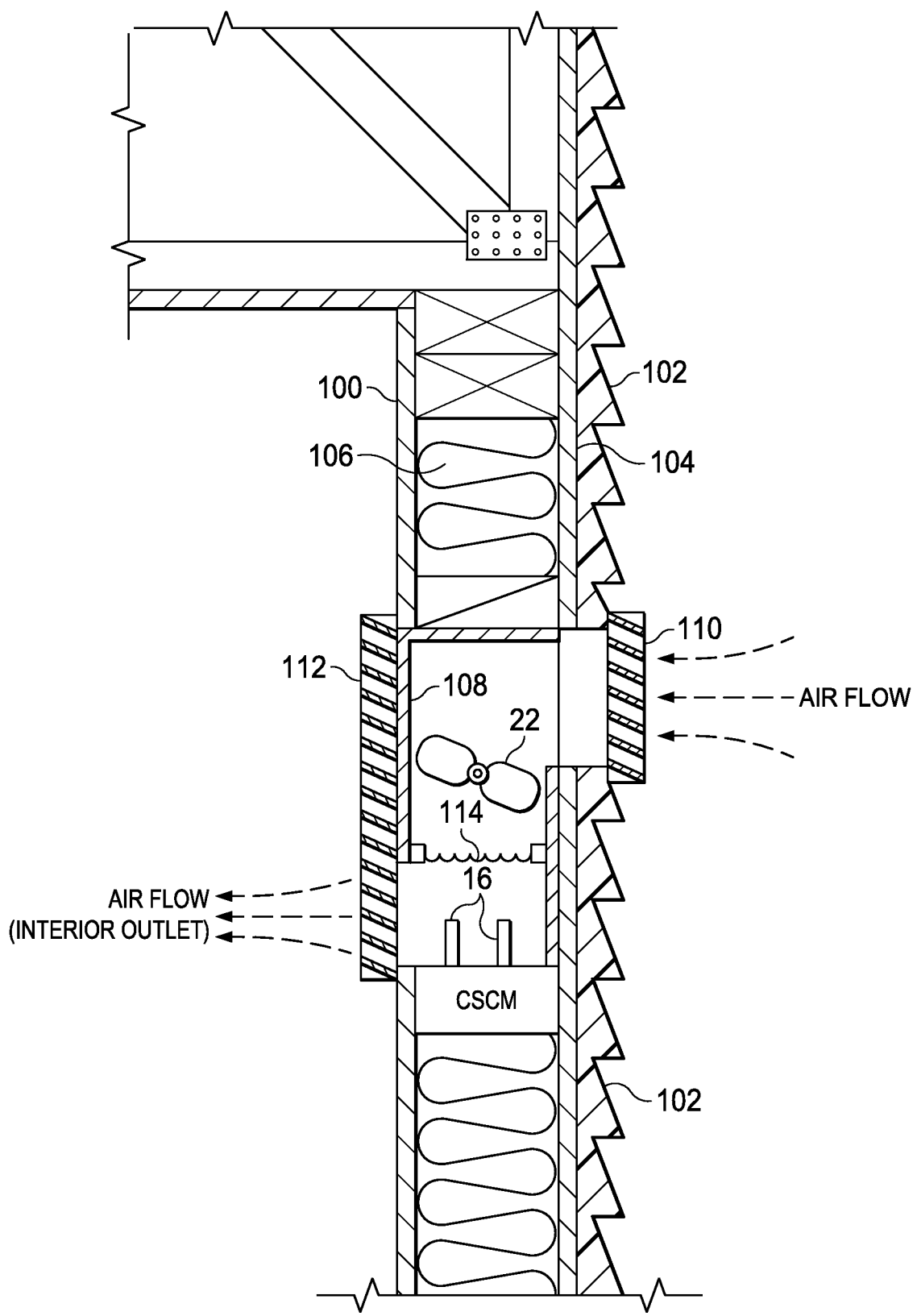
FIG. 9 illustrates a preferred embodiment CSCM as implemented within a wall.

Looking in greater detail at FIG. 9, the left of the Figure illustrates an interior area and the right of the Figure illustrates the exterior ambient. By way of example and as known in the art, the wall may be formed as a traditional 2×4" (or other dimension, such as 2×6") wall, where the depth of the wall is defined by the members (e.g., wood or metal) that separate the interior and exterior finish materials. In the example of FIG. 9, the interior of the wall is shown covered with sheetrock gypsum 100, and the exterior of the wall is covered by an exterior sheathing 102, which itself may be covered by an additional material such as the illustrated exterior siding 104. Also, in the wall space, that is, between the interior and exterior coverings, some type of insulation 106 is typically included, as also shown.

In accordance with the illustrated alternative preferred embodiment of FIG. 9, a CSCM is located in the wall space and has its temperature/humidity sensors 16 extending into a volumetric area that is preferably provided by a cabinet 108 (e.g., metal) located fully within the wall space. Thus, unlike earlier embodiments wherein the CSCM has its sensors 16 located in a inline duct; in FIG. 9 such sensors 16 extend into a volumetric area, such as provided by the cabinet 108, and that cabinet 108 may be located as a conduit for the passage of air as now further explored. Particularly, also in the preferred embodiment, the volumetric area includes a fan 22, controlled by the CSCM as described earlier, although subject to different programming as may be achieved by one skilled in the art, whereby the fan 22 when operated draws exterior air through an inlet grill cover 110, and a corresponding exterior-side located opening in the cabinet 108, then supplies that air flow through to the interior area via an interior-side located opening in the cabinet and an additional (e.g., directional) grill 112 cover corresponding to that cabinet opening. Note therefore that in a preferred embodiment as shown in FIG. 9, no additional duct is required, unless some short duct (not shown, but by example less than 12" or even less than 6") is located between the exterior grill 110 and the cabinet inlet corresponding to it. The cabinet volumetric area also may include a heating element 114 (e.g., akin, for example in some embodiments, to that of a hair dryer, hand dryer, or the like), where a small strip heating element is shown by example, and the CSCM may desirably and selectively (i.e., when desired) enable this heating element in response to detecting that exterior temperature is below a desired threshold and so as to warm such air in connection with it leaving the cabinet volumetric area and being supplied into the interior area.

From the above, one skilled in the art will appreciate that the FIG. 9 preferred embodiment provides an exterior wall mounted CFV system that allows for the successful installation of a whole house ventilation system in a new or retrofit construction project in an exterior wall location. This system has one or more of the following unique features:
(1) The entire cabinet 108 fits within the space of a standard (e.g., 2×4) wall cavity.
(2) The cabinet 108 is "insulated," by fitting solely within the wall, to allow the product to have:
   (a) Increased durability as it will be more resistant to condensation forming on the interior or exterior of the CFV cabinet during operation' and
   (b) Increased resistance to the transfer of heat through the wall during peak differences in temperature (i.e. resists cold in winter and resists heat in summer).
(3) The heating element 114 tempers the discharge air into the interior living space. This allows a wider band of acceptable exterior outdoor temperature range for performance selection.

Figure 10:
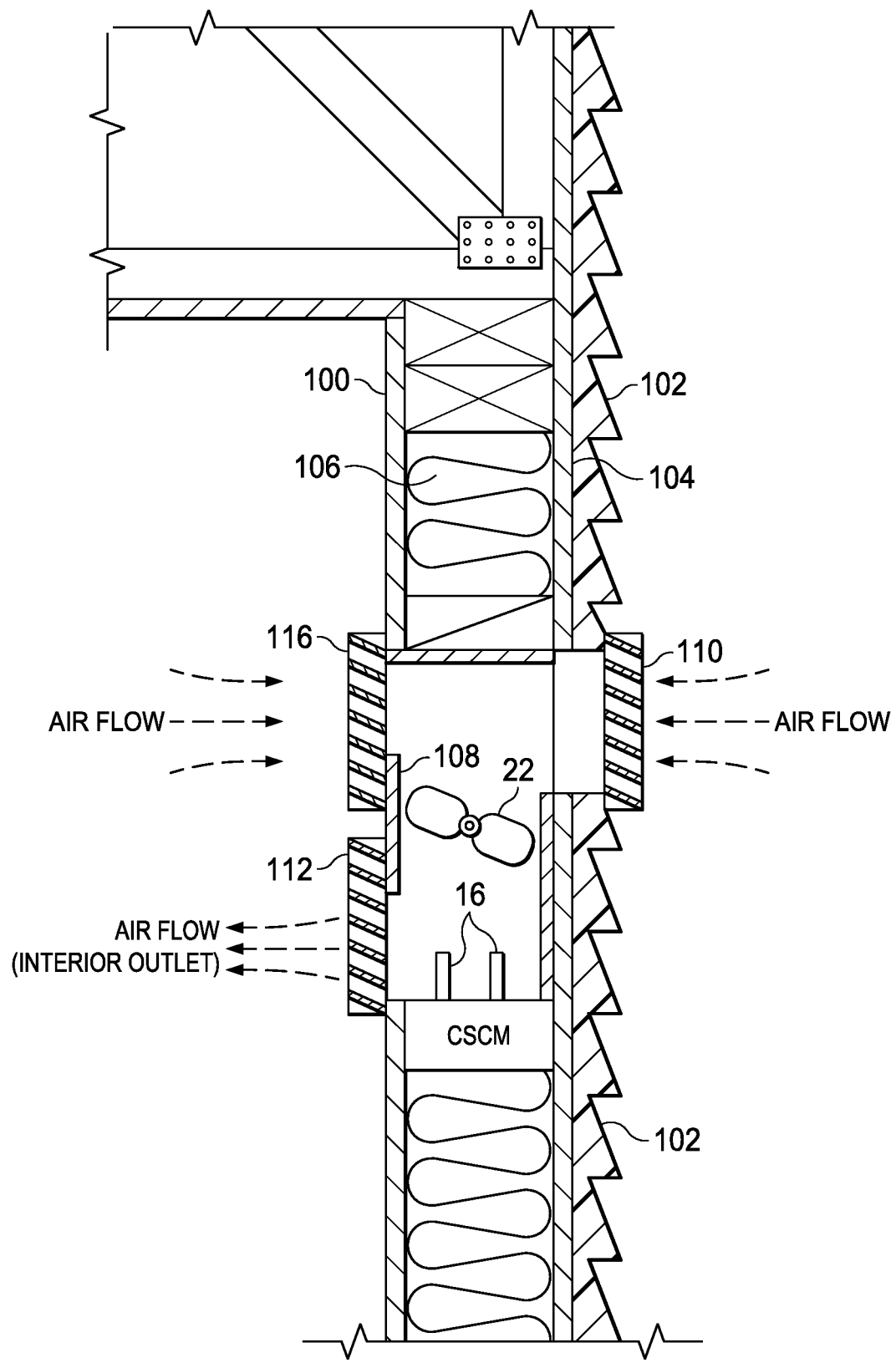
FIG. 10 illustrates an alternative preferred embodiment CSCM as implemented within a wall and operable to draw air either from the interior or exterior of the wall.

FIG. 10 illustrates another alternative preferred embodiment, comparable in many respects to that of FIG. 9, but also allowing a mixture of interior and exterior air for supply to the interior. FIG. 10, therefore, again illustrates a cross-section of a wall separating an interior area (left) from an exterior area (right), and with a CFV cabinet 108 located in the wall space, and the reader is assumed familiar with these and related details from the earlier discussion and the skill in the art.

As with the FIG. 9 embodiment, the FIG. 10 embodiment includes a CSCM, a fan 22, and both an exterior-side located opening (covered by the grill 110) for drawing air and an interior-side located opening for supplying interior air (covered by the grill 112). FIG. 10 also eliminates the heating element 114 in the cabinet volume from FIG. 9, thereby demonstrating that it is optional. The FIG. 10 embodiment, however, includes an additional interior-side located opening 116, shown in the illustration above the supply interior-side located opening, whereby additional interior air flow may be draw from the interior area into the volumetric area of the cabinet 108. In this way, therefore, operation of the fan 22 may cause a mixture of drawn air from both the exterior air and the interior air, with the CSCM appropriately evaluating and controlling the fan 22 to desirably obtain an acceptable temperature and/or humidity from either the drawn, or supplied (i.e., leaving), air. Thus, the return air from the interior space mixes with the outdoor ambient air and, when thereby sensed by sensors 16, allows for a wider temperature band of acceptable outdoor temperature because the mixed air temperature moderates the extreme cold or heat that would normally move the fan 22 to the low speed cycle mode, and at the same time, the mixed air from the unit will comparably reduce the mixed air humidity and thereby broaden the amount of humidity that is, as sensed by sensors 16, determined as acceptable to add into a single or multifamily residence.

Having demonstrated the alternatives of FIGS. 9 and 10, note that still other combinations may be implemented, consistent with the teachings of this document. As one particular example, a balanced system may be established by further modifying FIG. 10 to include an exhaust side on the cabinet 108 that provides an air flow outlet to the exterior. In this way, the CSCM may balance flow based on temperature/RH as influenced by both interior and exterior air.

The preferred embodiments also provide for various target markets and market considerations, such as residential (single family and multifamily) and small commercial spaces in need of ventilation and/or a mechanical method of compliance with the ASHRAE 62 Residential or Commercial Standard. The market can be segmented although the key (major) markets may be single family homes, multi-family developments (predominately apartments) and small commercial buildings, as further explored below.

With respect to single family residences, larger fan combinations work for larger single family homes. The CSVP embodiments can work with the smallest apartments and the largest homes. This flexibility comes from the simplicity of the control and the ability to connect it to the appropriately designed fan. The fan can be controlled for both constant or intermittent ventilation. The duct system can be designed for single terminal delivery or multi-port delivery to spread the distribution of fresh air around the structure.

Figure 11:
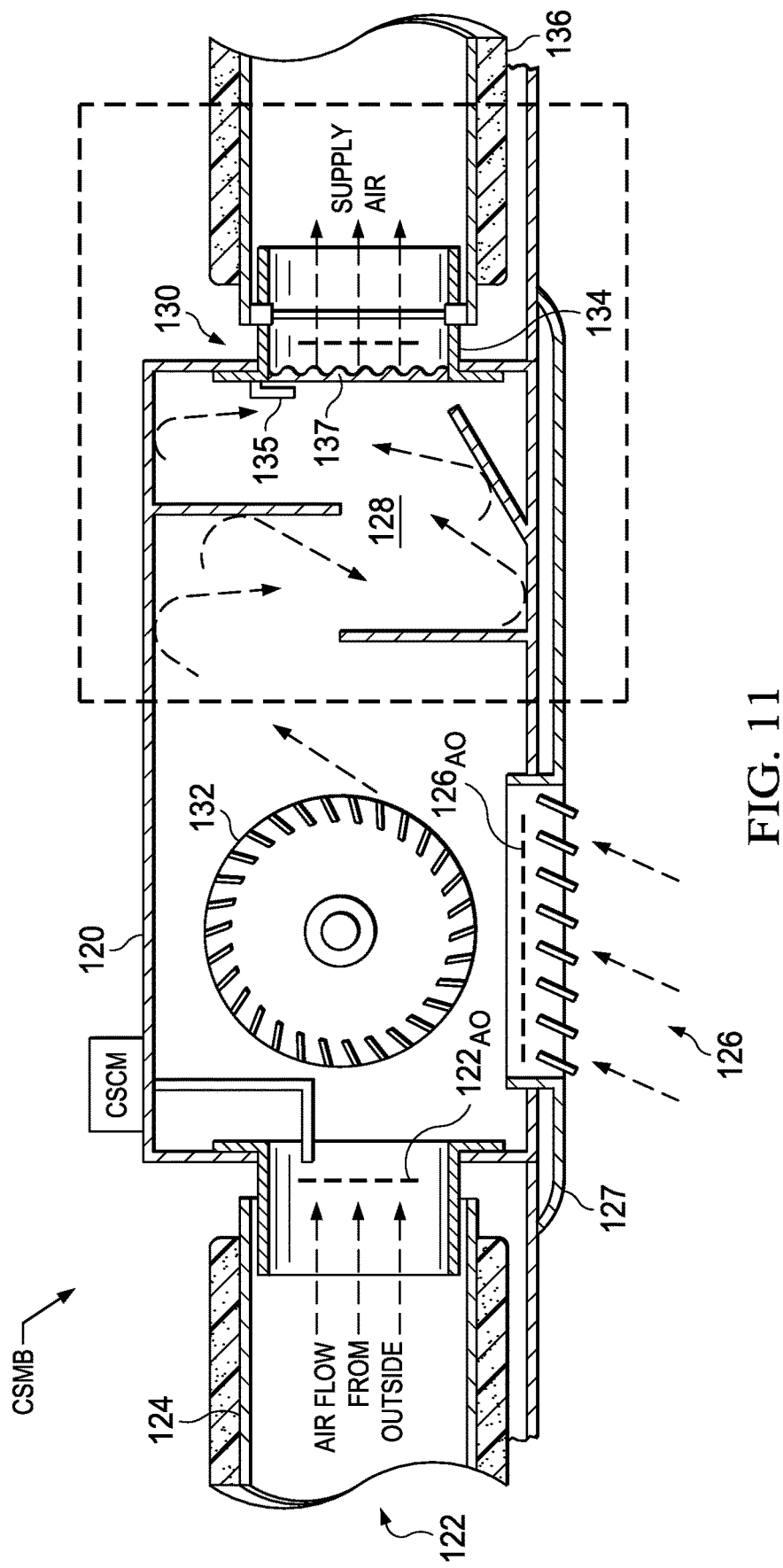
FIG. 11 illustrates a ventilation preferred embodiment "Climate Smart Mixing Box" or "CSMB."
Figure 12:
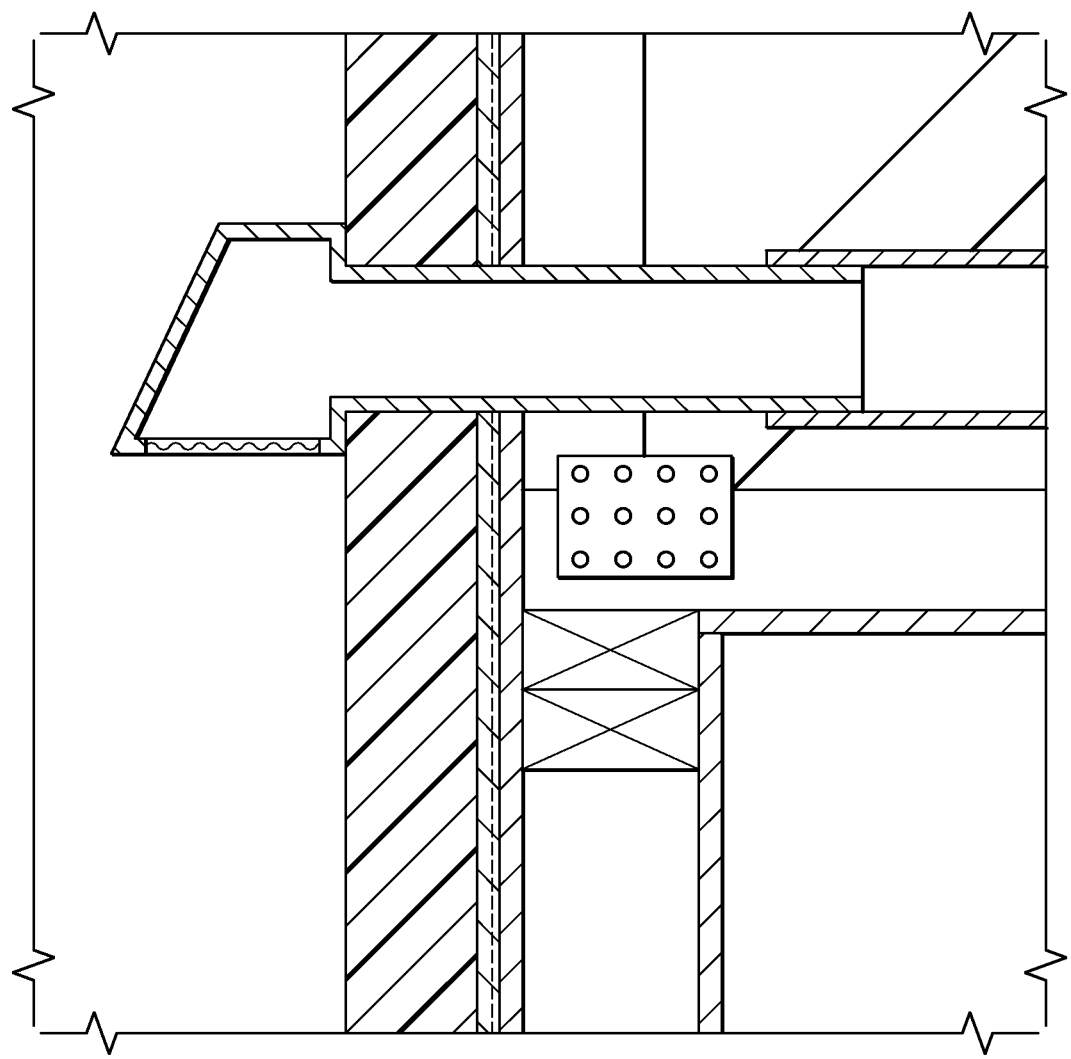
FIG. 12 illustrates an example of a ducting system and structure for supplying outside air to the CSMB of FIG. 11.

Further in connection with ventilation preferred embodiments, and either alone or in combination with the CSVPs as controlled by a CSCM, the inventive scope also contemplates what will be referred to herein as a "Climate Smart Mixing Box" or "CSMB." One embodiment of a CSMB is shown in cross-sectional view in FIG. 11, and additional details are shown and described in connection with subsequent Figures. Specifically, the CSMB includes a fan housing 120 and preferably designed and constructed so that it could fit in a furred down area, such as above the ceiling or in a closet where it would sit next to a vertical air handling device. As shown to the left of the fan housing 120, the CSMB has a first inlet 122 to receive outside air, and in one embodiment a CSCM is included with one or more sensors, for either or both of temperature and RH, to sense the outdoor air incoming into the first inlet 122. In the example of FIG. 11, the outside air is provided by connecting the fan housing 120 to a duct 124 that supplies outside air, as illustrated in FIG. 12. Returning to FIG. 11, as shown along the bottom edge of the fan housing 120, the CSMB includes a second inlet 126 to receive inside (return) air, as covered by a directional grill cover 127. As further appreciated below, the CSMB mixes these two sources of inlet air, from inlets 122 and 126, in an air mixing chamber 128, with the resulting mixed air then supplied, via an outlet 130, to the inside of the building structure (e.g., house, apartment, building, and the like). Finally, note that air is drawn into both CSMB inlets 122 and 126 by way of a fan 132 (and accompanying motor, not shown) located inside the fan housing.

Also in alternative preferred embodiments, the CSMB includes apparatus to establish a ratio between the amount of outside air drawn into the first inlet 122 and the amount of inside air drawn into the second inlet 126. In a first preferred embodiment for adjusting the ratio, this apparatus is by way of an adjustable opening $122_{AO}$ and $126_{AO}$, respectively, such as slidable openings, louvers, aperture adjustment, or the like, as shown by dotted lines in FIG. 11 at both the first and second inlets. In this embodiment, therefore, an installer may manually adjust (e.g., based on manufacturer suggested settings) the amount of fresh air from the outside via the first inlet adjustable opening $122_{AO}$ (e.g., in compliance to the requirements of ASHRAE 62.2) and the amount of recirculated air from the second inlet adjustable opening $126_{AO}$, so that the proper air flow (as tested during running time) and mixture can be achieved. This also allows the installer to adjust the inlet air ratio for the particular geographic location of the installation, whereby climates with more extreme temperatures and more extreme humidity will require more total air to be recirculated from the unit (i.e., drawn from the inlet 126). Given this configuration, in an embodiment without a CSCM, the fan 132 may draw air from both outside and inside in a ratio determined by the first inlet adjustable opening $122_{AO}$ and the second inlet adjustable opening $126_{AO}$. For example, the CSMB may mix a ratio of three to four parts interior air with one part exterior air, without consideration of temperature or RH.

In a second preferred embodiment for adjusting the ratio, an electronic controller, such as the illustrated CSCM with added logic and circuitry, or a controller that operates independent of one or both of ambient temperature or RH, may be used, further in combination with a variable speed fan motor (not shown) that operates the fan 132. In this case, the controller may automatically adjust the amount of recirculated air that comes through the second inlet 126 (and optionally the supply air from the first inlet 122), based on the sensed temperature and the humidity of either the mixture or the first inlet air—thus, while not shown, it is to be understood that the CSMB may operate in combination with the temperature/RH sensor functionality, as described earlier, of a CSCM. Thus, as outdoor air conditions approach customer specific predesigned levels of temperature and humidity, the fan 132 will increase or decrease in air capacity moved and an automatic apparatus $126_{AO}$ (e.g., damper) will open or close a portion of the area of the second inlet 126, based on the need to mix or not mix air. Also preferably, a failure of the damper motor will end with the damper in the open position that allows the maximum recirculation of internal residential air to enter via the second inlet. Note that the inclusion of the CSCM in combination with the CSMB, to control either the ratio as well as a selective determination of when to enable or disable the fan, based on one or both of temperature and RH, allows a wider band of air temperature to be mixed as compared to an earlier CSCM only embodiment, that is, both lower and higher temperature and a higher amount of RH may be considered for mixing and flow. This occurs because the mixed air can temper the air that is brought in by the CSCM and the CSCM can set appropriate limits on acceptable temperatures (both high and low) and acceptable relative humidity that allow the lower air mixing rate to add value to the combination.

Figure 13:
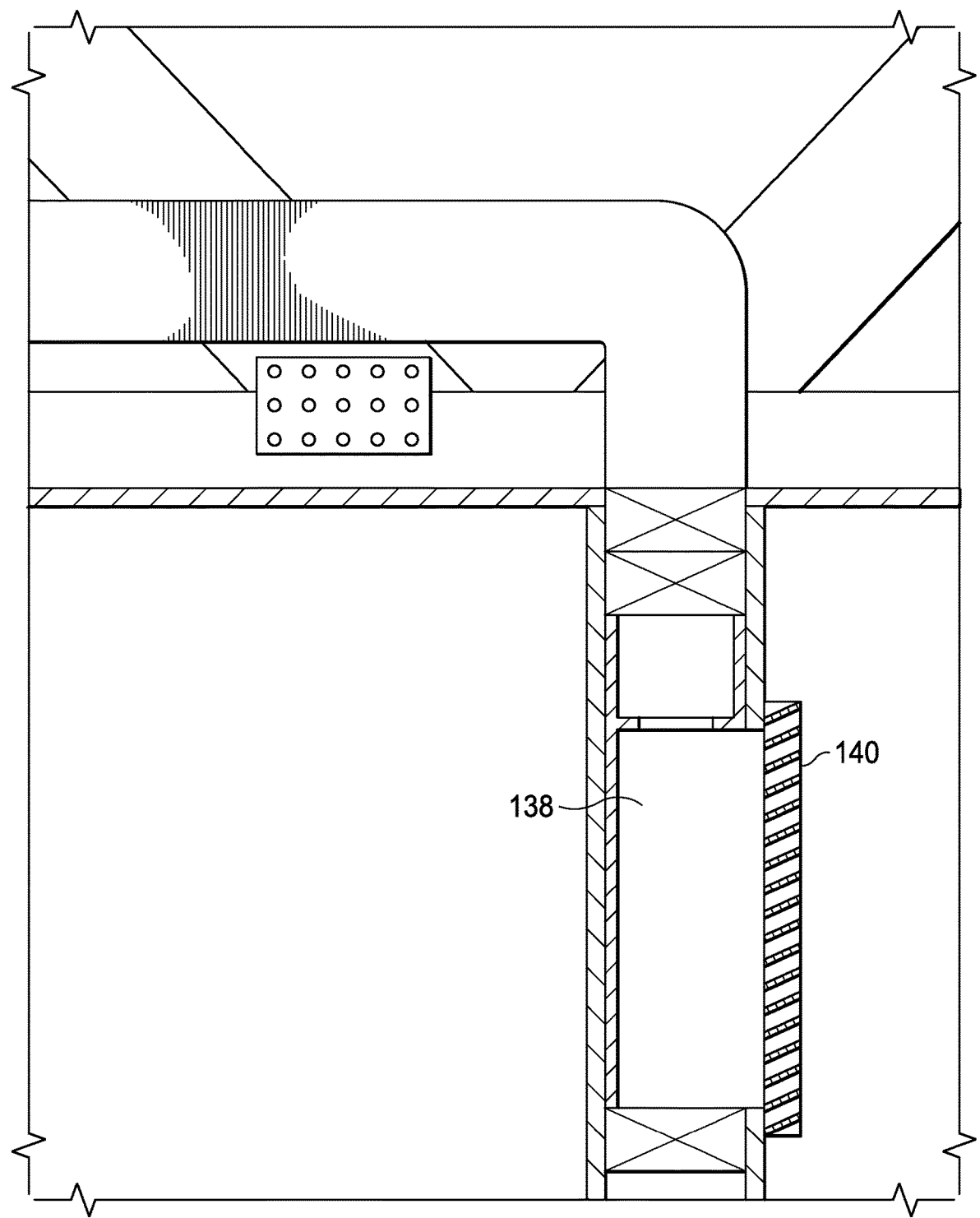
FIG. 13 illustrates an example of a ducting system and structure for distributing air from the CSMB of FIG. 11.
Figure 14:
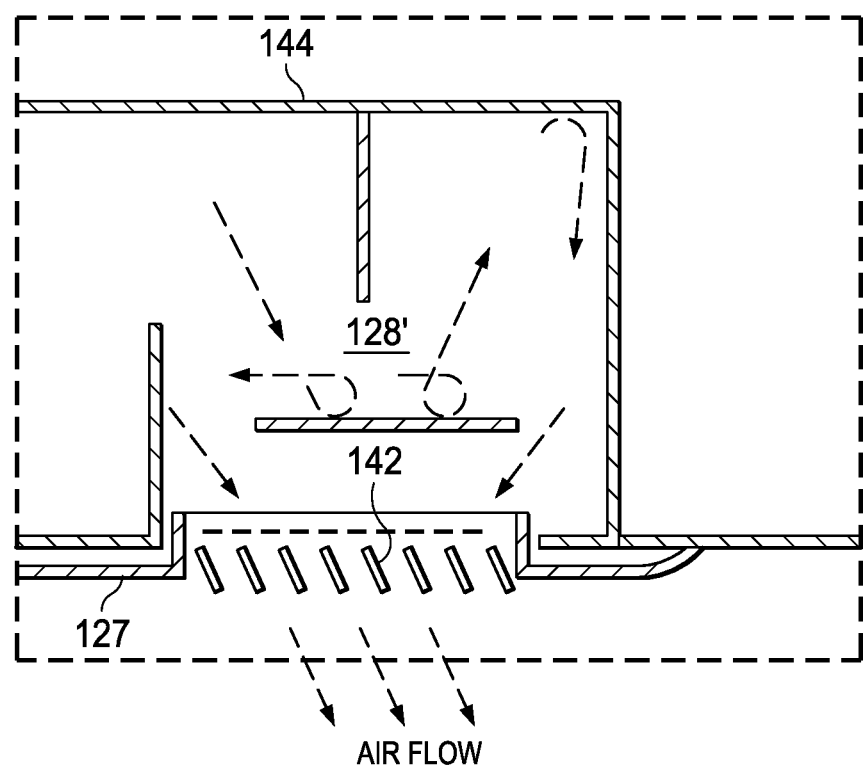
FIG. 14 illustrates an alternative example of an outlet system of the CSMB of FIG. 11.

Completing the discussion of FIG. 11, once air is drawn from the first and second inlets 122 and 126 per the alternative preferred embodiments described above, the air passes into the air mixing chamber 128. The air mixing chamber 128 preferably includes some form of turbulence inducing structure so as to further facilitate the mixing of the outside and inside air, and optionally a sensor 135 in included in this chamber for sensing one or both of temperature/RH of the mixed air. The turbulence-mixed air is then supplied, via outlet 130, and passing by an optional heating element 137, to the inside of the building. Preferably, both the sensor 135 and the heating element 137 communicate with a controller, such as the CSCM. In a first example of an air delivery method shown in FIG. 11, this supply occurs by passing the mixed air, via a coupler 134, into another duct 136. Duct 136 may couple to the building structure's existing ducting, or in some other manner, so as to provide the mixed air to the building structure interior, as is shown by way of example in FIG. 13 wherein the supplied air enters a supply boot 138 and may then exit via a supply grill 140. An alternative second example of air delivery is shown in FIG. 14, wherein the air mixing chamber 128' includes a supply air grill 142 as a portion of the housing 144, whereby the mixed air is immediately exhausted from the chamber to the building structure interior. In all events, note that the inclusion of sensor 135 and/or the heating element 137 provide still additional functionality. Particularly, therefore, the CSMB with temperature/RH values ascertainable by the CSCM (with the benefits listed above) and the leaving air temperature sensor 135 permit adding heat, via the element 137, into the exiting air even after the mixing. This provides benefit in that the unit can have an even lower acceptable inlet temperature and this can widen the band of acceptable entering air conditions accepted by the CSCM and essentially make the product available all year in all climate zones and be a low cost deliver of fresh air product that comes close to 62.2 and 62.1 requirements in the control mode.

The embodiments of FIGS. 11 through 14, therefore, provide structure and methodology for controllably mixing a ratio of outside and inside (return) air, with the mixed air then supplied to the building structure interior. The controllability of the preferred embodiments permits a different ratio to be used either at the same location but at different times, or by having a first ratio set for one use of a CSMB in a first geographic location and a second and different ratio set for another use of a CSMB in a second geographical location. In this way, the ratio may be adjusted to allow exterior air for sourcing in a structure while also allowing the interior return air to mitigate or dilute any effects from the exterior air, such as temperature or humidity (and possibly others). For example, therefore, the CSMB adds sufficient indoor air to mitigate the amount of humidity brought inside by the outside fresh air stream and also to temper the air to a manageable/comfortable level. In one preferred embodiment, the controller or adjustable apparatus that dictates the ratio will have a onetime setting, allowing the designer and installer to fit the CSMB to the design characteristics of the weather (and possibly other conditions) where the building will be built. In another preferred embodiment, the CSMB controller (e.g., CSCM) has the ability to vary the air mixture ratio based on the characteristics of the outdoor air (e.g., temperature and humidity) and the variations will be based on how much outside air the unit will be able to pull and variations on the cubic feet per minute of inside air the unit will need to mitigate the worst case scenario as seen by the designer.

As an example as to the mixing ratio of the CSMB, some initial settings for apartment dwellings may have a requirement for 30 CFM constant of mechanical (outside) fresh air. Given the grains of moisture in a worst case scenario in a geographic location such as Dallas, Tex., with that design scenario, the hypothetical setting for a CSMB would be 120 CFM, and the unit would be designed and/or controlled to draw 30 CFM from outside and 90 CFM of return from inside the apartment unit. The 90 CFM would be sufficient to both temper the air for comfort and mix whatever humidity that is in the outside air sufficiently to ameliorate the impact of moisture on ducts and the units. Another variable would be a 60 CFM fan with 30 CFM from outside mixed with 30 CFM of inside air using the CSCM which allows a wider range of temperature and a leaving air sensor and electric heat which also expands the low range of outdoor temperature that can be absorbed without creating severe energy penalty, exacerbated microbial conditions or comfort problems.

With respect to residences, the multifamily category is the area where there is the early opportunity for these product offerings. The objections to the existing product offerings are high, the costs of the existing product offerings are high and the current and future development numbers of multifamily dwelling units to be built are very large. The objective of the preferred embodiments may include providing a sensible, effective, low cost, and easy to understand and install method of compliance to ASHRAE 62.2 for delivery of fresh air and compliance to Energy and Mechanical Code and above code programs.

Mechanical ventilation required by the energy certification standards present challenges for multifamily developers, and many of these, shown below, may be addressed with the preferred embodiments:

1. Mechanical ventilation adds considerable cost and impact to the development and construction budgets.
2. Exterior aesthetic of the multifamily buildings may be compromised by an increased number of exhaust or air intake penetrations.
3. Sometimes the building exterior may not have sufficient area in which to locate the penetrations and satisfy the building code requirements for distances between exhaust and fresh air intake locations;
4. Added penetrations in the exterior wall create more locations through which moisture may penetrate, possibly resulting in microbial (mold and mildew) growth in or on the wall cavity representing a potential health hazard to occupants, or resulting in damage to building materials and finishes;
5. If hot, humid outside air is brought into the living space, this may create comfort issues for the occupants. The persistent presence of humid air also may increase the likelihood of microbial growth within the living space, potentially creating health hazards for sensitive individuals;
6. The additional equipment and duct runs for multiple exhaust and Return Air may require furr downs or wider wall cavities due to structural and space limitations, thereby affecting the interior aesthetics and potentially reducing rentable floor area and impacting project revenue.

7. Space limitations are an issue in multifamily and the ability to locate the CSV family anywhere within the structure or the interstitial space gives a lot of flexibility for the developer. The fact that the CFV can serve two purposes also reduces first cost which is a very significant burden to the projects financing.

Lastly, a major emerging market will be "energy efficient" and "green" retrofit of buildings in all three segments. While this is not currently a focus for manufacturers and distributors of ventilation products, it is a major focus of Public Policy driven by the Department of Energy and for the Building Science Community. In the back half of the decade, the energy and environmental retrofit market is likely to explode. The existing products for mechanical ventilation are not well positioned to address the needs of ventilation as trends tighten the existing home, apartment, and building market. This is one particular place where the opportunity exists for wireless controls that allow ventilation to react to the ambient conditions in an effective fashion with the minimum reconstruction of the existing structure.

Given the preceding, the preferred embodiments provide improved ventilation systems for dwellings such as residential, multifamily, and small commercial buildings, and are more particularly to a system for use with supply ventilation or in combination with balanced ventilation. These embodiments provide numerous benefits over the prior art, many of which are indicated in summary and/or described above and others of which may be ascertained by one skilled in the art, and still others of which include the following principles and benefits:

1. Easier control of the amount of ventilation with a dedicated fan.
2. Fewer exterior outlets are a desirable outcome.
3. Reductions in the number of fans (given design) and thereby saving money.
4. CSCM control allows for air when it is acceptable and offer the opportunity to automate having no fresh air when owner thinks it is inappropriate or damaging.
5. A duct (exhaust or supply) can reduce the number of exterior penetrations (i.e. if it was located in a corridor).
6. Supply of outdoor air through a small return air filter grill with a filter allows for good filtration.
7. Two speed fans may allow for kitchen exhaust (100 CFM) and also provide whole house ventilation at reduced amounts (50 CFM), using an appropriate override switch
8. A smart controller (e.g., within the CSCM) gives the ventilation designer flexibility.
9. 100 CFM remote "in line fan" that has exhaust vent in the kitchen can pull 100 CFM out of the kitchen and needs a "switch" by the stove, can put the vent anywhere in the kitchen, and the fan is set remotely for exhaust (timer on fan at 100 CFM).

The preferred embodiments are directed to numerous objects and have various technical advantages, any of which are singularly or cumulatively beneficial, and some of which are listed below. Moreover, the preferred embodiments include objects and benefits in consideration of comparison to supply only systems, in comparison to balanced only systems, and in considerations of a new overall product and system that further lends to a family of products.

Supply Only

The preferred embodiments have a strong competitive response to the problems of Supply Only systems:

1. A preferred embodiment includes a relatively simple "in line" fan integrated with, or operating in response to, a CSCM.
2. A preferred embodiment requires no thermostat, no remote thermostat to Air Handling Unit (AHU) controller, and no return duct to the air handing system.
3. A preferred embodiment can be attached directly to a duct connected to a fan to pull air across sensors and control a switch on and off. This may allow ventilation completely separate from the HVAC system and (likely) dramatically reduces the installed cost of ventilation methods that support compliance to the ASHRAE 62.1 and 62.2 Standards.
4. A preferred embodiment system is easily designed and measured to comply with the required flow rates of 62.2 connect a fan to a 62.2 controller and it can search for how often it needs to run and when it runs.
5. The fans selected when using a preferred embodiment CSVP, controlled by a CSCM, will have low power usage and will comply with the basic 2012 IECC Code requirements and will not incur energy modeling "energy penalty" and thus save many projects hidden investments in other efficiency features.
6. The preferred embodiments will be cost leaders:
   a. Installation is quick and simple.
   b. Many of the core products consist of readily available, high volume production components that can be reconfigured into CSVP apparatus, keeping the product costs in control and ensuring cost leadership in their category.
   c. The total installed cost, that is, the cost of product and cost of installation, will be lower and the net impact means value and high total return on investment.
   d. Simplicity and speed of installation method will be lower than comparable methods and there will be less frustration by trade contractors and less training time because the installations are simple and common.
   e. The fans are preferably designed to have high power (larger air flow against duct resistance), so there will be extreme flexibility of installation location meaning designers will have the maximum number of locations to put the products within structures—saving costs and improving aesthetics of the design elements not related to ventilation.
   f. There will be a lower energy penalty (fan power from a small fan versus fan power from an air handling unit fan) saving on the utility bill.
   g. The products will be designed for low sone rating—meaning (essentially) low to no noise. This will lead to making ventilation a background operating system that truly stays in the background.
   h. Performance testing confidence will be higher as the preferred embodiment CSVP system innovations are vastly easier to test the performance of the supply air allowing projects to meet program requirements with confidence.
   i. There will be fewer concerns related to impact on building and occupants related to high and low temperatures and humidity.
   j. There are fewer long term maintenance issues from the air handling unit operations as the HVAC system will now only run when there is a call for cooling or heating vs. vastly more often in shoulder seasons.
   k. There will be fewer maintenance issues from CSVP apparatus as our product components used therein typically require very little maintenance, are historically very durable, and are easy to repair and inexpensive to replace when and if they do fail.

Balanced Only

The preferred embodiments have a strong competitive response to the problems of balanced only systems:
1. A preferred embodiment climate sensing fresh air product is expected to do a better job of controlling cost (simple product, high volumes and ease of install). These products will be the first cost, operating cost and life cycle cost leader in their class.
2. The preferred embodiments do not transfer heat but, the cross benefit is that internal humidity is ejected from the space and high humidity can be prevented from entering with the CSCM.
3. The flexibility of design and small space requirements mean that that the product can have many more potential installations in a home, apartment, or small commercial space, as compared to more traditional products.
4. The preferred embodiments are easier and faster to install and will have a lower total installed cost—ERV's are traditionally more expensive than other options for mechanical fresh air.
5. The preferred embodiments will help prevent humidity build up—the lowest cost ERV's have heat transfer devices that do transfer a bit of heat but do not really exhaust humidity and instead inject the humidity back into to occupied space.
6. Some future applications of the preferred embodiments will offer the opportunity to separate the supply and removal of air providing an improved mix within to occupied space or to mix the incoming fresh air with existing air from the structure to reduce the impact of temperature and humidity and widen the band of acceptable outside air that allows for improved ventilation performance and improves the likelihood of acceptable indoor air quality.
7. Flexibility of location—ERV's cannot be located in kitchens or laundry rooms. However, certain preferred embodiments will have many kitchen and laundry room locations where it will be acceptable for locating the product.
8. ERV's (in multifamily applications) have large exposed grilles and are not particularly aesthetic in appearance. Preferred embodiments, where applicable can utilize that approach, can be mounted on or partially within a wall (laundry room or kitchen), in a furr down, or a host of other flexible locations.
9. The preferred embodiment CSVP family in general and certain products specifically will require less maintenance and perform longer than the typical ERV.

Other Design Benefits

The preferred embodiments also provide benefits with respect to general design considerations for a new ventilation product/family of products, including but not limited to the following:
1. Simple design
2. Easy to understand, easy to install, easy to use
3. Low cost—first time, operating
4. Low failure rate—long product life cycle
5. Low maintenance requirement
6. Low impact
    a. Flexible on exterior terminations
    b. Quiet—low impact on noise (design, location, noise reduction casing)
    c. Not in the critical path of scheduled completion (measure it easily, and meet the performance characteristics)
    d. No impact on load calculation
    e. No impact from humidity
7. Address the issues of multifamily
    a. Price—first cost
    b. Location in unit—flexibility
    c. Size—location and appearance
    d. Temperature and humidity impact—improve likelihood of building durability
    e. Installation issues—ease
    f. Supply only in some embodiments
    g. Balanced offering in some embodiments
    h. Fire dampers—provide options where they can be eliminated in multifamily structures and thereby keep the total cost of installation low.
    i. Control of noise through the low sone rating and (often) remote location of the fan.
    j. Aesthetics—improve exterior appearance levels by having smaller penetrations that require smaller wall caps.
    k. Controls infiltration through positive pressure or balanced ventilation.
    l. Space—utilizes as little as possible space which is especially important in the space constrained multifamily segment.
    m. Water intrusion—smallest possible impact by reduction in the size of the wall penetration and options for future design impact
    n. Penetrations—limit, options for future design impact by reducing the total number of required penetrations
    o. Enhancement of and leveraging on established technologies which will provide for rapid market adoption.
    p. Provides a reduction in total construction costs while adding increased value over other options.

Thus, the inventive scope is demonstrated by the teachings herein and is further guided by the following claims.

What is claimed is:

1. A supply ventilation system controller for locating at an interior of a building, comprising:
    circuitry for receiving a signal representative of exterior air temperature from air exterior of the building;
    circuitry for receiving a signal representative of exterior relative humidity from relative humidity of air exterior of the building;
    circuitry for establishing at least a first range of acceptable temperature;
    circuitry for establishing at least a first range of acceptable relative humidity;
    circuitry for providing a first control signal to enable a ventilation exterior-to-interior supply fan to a first speed in response to at least one of:
        the signal representative of exterior air temperature indicating dissatisfaction of the first range of acceptable temperature; or
        the signal representative of exterior relative humidity indicating dissatisfaction of the first range of acceptable relative humidity; and
    circuitry for providing a second control signal to enable the ventilation exterior-to-interior supply fan to a second speed, greater than the first speed, in response to both:
        the signal representative of exterior air temperature indicating satisfaction of the first range of acceptable temperature; and the signal representative of exterior relative humidity indicating satisfaction of the first range of acceptable relative humidity; and
    wherein the circuitry for providing the first control signal and the circuitry for providing the second control signal provide the first control signal and the second control signal irrespective of air temperature interior to the building and irrespective of relative humidity of air interior to the building.

2. The controller of claim 1 wherein the circuitry for providing a first control signal and the circuitry for providing a second control signal are further for providing the first control signal and the second control signal to a ventilation interior-to-exterior exhaust fan.

3. The controller of claim 2 wherein the exterior-to-interior supply fan and the interior-to-exterior exhaust fan are driven by a same motor.

4. The controller of claim 1 wherein the first speed is zero and the second speed is non-zero.

5. The controller of claim 1 wherein the circuitry for providing the first control signal and the circuitry for providing the second control signal are further for providing the first control signal and the second control signal in response to an additional signal representative of an exterior air parameter other than air temperature or relative humidity.

6. The controller of claim 1 wherein the circuitry for providing the first control signal and the circuitry for providing the second control signal are further for providing the first control signal and the second control signal in response to a signal representative of an amount of exterior air pollen count.

7. The controller of claim 1 wherein the circuitry for providing the first control signal and the circuitry for providing the second control signal are further for providing the first control signal and the second control signal in response to a signal representative of an amount of exterior air particulate count.

8. The controller of claim 1 and further comprising:
circuitry for providing a first control signal to enable the ventilation exterior-to-interior supply fan to a third speed, less than the first speed, in response to both of:
the signal representative of exterior air temperature indicating dissatisfaction of the first range of acceptable temperature; and
the signal representative of exterior relative humidity indicating dissatisfaction of the first range of acceptable relative humidity.

9. The controller of claim 1 and further comprising circuitry for providing an enable-signal to the ventilation exterior-to-interior supply fan periodically so as to draw exterior air for sampling by the circuitry for providing the signal representative of exterior air temperature and for sampling by the circuitry for providing the signal representative of exterior relative humidity irrespective of air temperature exterior to the building and irrespective of relative humidity of air exterior to the building.

10. The controller of claim 1 and further comprising a segment of duct, wherein the signal representative of exterior air temperature and the signal representative of exterior relative humidity are both responsive to air passing through the segment of duct.

11. The controller of claim 1 and further comprising an in-wall volumetric enclosure, wherein the signal representative of exterior air temperature and the signal representative of exterior relative humidity are both responsive to air passing through the in-wall volumetric enclosure.

12. The controller of claim 11 and further comprising a heating element for selectively adding heat to air located in an interior of the volumetric enclosure.

13. A ventilation supply apparatus for affixing at a position relative to a building, comprising:
a segment of duct having a length between 6 and 24 inches;
a ventilation exterior-to-interior supply fan located within an interior of the segment and for directing air through the interior;
an electronic controller coupled to the segment, the controller comprising:
circuitry for receiving a signal representative of exterior air temperature from air exterior of the building; and
circuitry for receiving a signal representative of exterior relative humidity from relative humidity of air exterior of the building;
circuitry for providing a first control signal to enable the ventilation exterior-to-interior supply fan to a first speed in response to at least one of:
the signal representative of exterior air temperature indicating dissatisfaction of a first range of acceptable temperature; or
the signal representative of exterior relative humidity indicating dissatisfaction of a first range of acceptable relative humidity; and
circuitry for providing a second control signal to enable the ventilation exterior-to-interior supply fan to a second speed, greater than the first speed, in response to both:
the signal representative of exterior air temperature indicating satisfaction of the first range of acceptable temperature; and
the signal representative of exterior relative humidity indicating satisfaction of the first range of acceptable relative humidity; and
wherein the circuitry for providing the first control signal and the circuitry for providing the second control signal provide the first control signal and the second control signal irrespective of air temperature interior to the building and irrespective of relative humidity of air interior to the building.

14. The apparatus of claim 13 wherein the circuitry for receiving a signal representative of exterior air temperature and the circuitry for receiving a signal representative of exterior relative humidity both communicate with at least one sensor located within an interior of the segment.

15. The apparatus of claim 13 wherein the circuitry for receiving a signal representative of exterior air temperature and the circuitry for receiving a signal representative of exterior relative humidity both communicate with at least one sensor located apart from the segment.

16. The apparatus of claim 13 wherein the circuitry for receiving a signal representative of exterior air temperature and the circuitry for receiving a signal representative of exterior relative humidity both communicate with at least one sensor that communicates wirelessly with the circuitry for receiving a signal representative of exterior air temperature and the circuitry for receiving a signal representative of exterior relative humidity.

17. A ventilation supply apparatus for installation into a building having a wall, comprising:
a singular cabinet, comprising:
a frame for attaching through the wall, wherein the frame comprises:
a first inlet coupled to an exterior of the wall for receiving air sourced from an area exterior of the building;

a second inlet for receiving air sourced from an area interior of the building; and an outlet coupled to an interior of the wall for providing an air mixture directly to the interior of the building, the mixture comprising the air sourced from an area exterior of the building and the air sourced from an area interior of the building a fan for drawing air into the first inlet and the second inlet;

circuitry for receiving a signal representative of exterior air temperature from air exterior of the building;

circuitry for receiving a signal representative of exterior relative humidity from relative humidity of air exterior of the building;

circuitry for providing a first control signal to enable a ventilation exterior-to-interior supply fan to a first speed in response to at least one of:

the signal representative of exterior air temperature indicating dissatisfaction of the first range of acceptable temperature; or the signal representative of exterior relative humidity indicating dissatisfaction of the first range of acceptable relative humidity; and circuitry for providing a second control signal to enable the ventilation exterior-to-interior supply fan to a second speed, greater than the first speed, in response to both:

the signal representative of exterior air temperature indicating satisfaction of the first range of acceptable temperature; and the signal representative of exterior relative humidity indicating satisfaction of the first range of acceptable relative humidity; and wherein the circuitry for providing the first control signal and the circuitry for providing the second control signal provide the first control signal and the second control signal irrespective of air temperature interior to the building and irrespective of relative humidity of air interior to the building.

18. The apparatus of claim 17 and further comprising an apparatus for adjusting a mixture ratio of the air sourced from an area exterior of the building and the air sourced from an area interior of the building.

19. The apparatus of claim 18 wherein the apparatus for adjusting comprises a mechanically adjustable member for adjusting an amount of air that passes through the second inlet.

20. The apparatus of claim 18 wherein the apparatus for adjusting comprises an electromechanical apparatus for adjusting an amount of air that passes through the second inlet.

21. The apparatus of claim 20 wherein the electromechanical apparatus is responsive to at least one of:

a signal representative of exterior air temperature; or a signal representative of exterior relative humidity.

22. The apparatus of claim 17 and further comprising a chamber, the chamber comprising turbulence apparatus, for mixing the mixture.

23. The apparatus of claim 17 and further comprising a heating element for selectively adding heat to the air mixture.

* * * * *